(12) United States Patent
Mitsuhashi

(10) Patent No.: US 7,950,741 B2
(45) Date of Patent: May 31, 2011

(54) CONNECTION DEVICES IN VEHICLE SEATS

(75) Inventor: Atsutaka Mitsuhashi, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 211 days.

(21) Appl. No.: 12/467,548

(22) Filed: May 18, 2009

(65) Prior Publication Data
US 2009/0289488 A1 Nov. 26, 2009

(30) Foreign Application Priority Data

May 22, 2008 (JP) ................................. 2008-134198

(51) Int. Cl.
*B60N 2/22* (2006.01)
*B60N 2/235* (2006.01)

(52) U.S. Cl. ..................... 297/362; 297/366; 297/367 R; 297/367 P; 297/367 L

(58) Field of Classification Search .................. 297/362, 297/366, 367 R, 367 P, 367 L
See application file for complete search history.

(56) References Cited

U.S. PATENT DOCUMENTS

| | | | | |
|---|---|---|---|---|
| 7,322,654 B2 * | 1/2008 | Kawashima | ................... | 297/362 |
| 7,380,882 B2 * | 6/2008 | Oki | ............................. | 297/367 R |
| 7,384,101 B2 * | 6/2008 | Kawashima et al. | .......... | 297/362 |
| 7,513,572 B2 * | 4/2009 | Kawashima | ................... | 297/362 |

FOREIGN PATENT DOCUMENTS

JP  2007-130237 A  5/2007

OTHER PUBLICATIONS

English language Abstract of JP 2007-130237 A (May 31, 2007).
U.S. Appl. No. 12/357,787 to Mitsuhashi, filed Jan. 22, 2009.
U.S. Appl. No. 12/375,588 to Mitsuhashi et al., filed Jan. 29, 2009.
U.S. Appl. No. 12/408,947 to Endo et al., filed Mar. 23, 2009.

* cited by examiner

*Primary Examiner* — Rodney B White
(74) *Attorney, Agent, or Firm* — Greenblum & Bernstein, P.L.C.

(57) ABSTRACT

A connecting device may include first and second connecting elements that are axially oppositely coupled to each other so as to be rotatable relative to each other, and a retainer member that is arranged and constructed to clamp the first and second connecting elements. The second connecting element has a plurality of radially projected portions and a plurality of radially depressed portions that are respectively formed in a circumferential end surface thereof. The retainer member has a first retainer portion, a second retainer portion, a plurality of fixing portions and a plurality of supplemental retainer portions. The supplemental retainer portions are arranged and constructed to be axially supported by a support die of a crimping machine when the end peripheries of the fixing portions are crimped while the second retainer portion is axially supported by the support die.

3 Claims, 19 Drawing Sheets

CONNECTION DEVICES IN VEHICLE SEATS

This application claims priority to Japanese patent application serial number 2008-134198, the contents of which are incorporated herein by reference.

BACKGROUND OF THE INVENTION

1. Field of the Invention

The present invention relates to connection devices in vehicle seats. More particularly, the present invention relates to connection devices for rotatably connecting two components (e.g., seat backs and seat cushions) of vehicle seats.

2. Description of Related Art

Generally, a vehicle seat includes a seat back and a seat cushion. The seat back and the seat cushion are rotatably connected via a seat reclining device for adjusting a tilt angle of the seat back. Such a seat reclining device is taught, for example, by Japanese Laid-Open Patent Publication Number 2007-130237.

The known seat reclining device includes a pair of opposing disk-shaped housings, i.e., a first or rotational housing (ratchet) and a second or stationary housing (guide). The first housing is affixed to the seat back. The second housing is affixed to the seat cushion. The first and second housings are axially mated or coupled to each other, so as to move or rotate relative to each other around a rotational shaft. Also, the first and second housings are circumferentially connected by an annular fastener or clip ring along peripheral edges thereof, so as to not be axially disengaged from each other.

The seat reclining device further includes a locking mechanism that can prevent the first housing from rotating relative to the second housing, so as to lock the seat reclining device. The locking mechanism essentially consists of a slide cam and slide pawls that are positioned between the housings. The slide cam is slidably received between guide members that are formed within the second housing, so as to radially move on the second housing when the rotational shaft is rotated. Conversely, the slide pawls are slidably received between the guide members, so as to radially move on the second housing. Further, the slide pawls are respectively arranged so as to move in the directions perpendicular to the slide cam. In addition, each of the slide pawls is provided with a convex toothed portion.

When the rotational shaft is rotated to a locking position, the pawls are radially moved outward via the slide cam, so that the respective convex toothed portions of the pawls engage a concave toothed portion that is circumferentially formed over an inner circular surface of a peripheral edge of the first housing. In this state, the first housing is prevented from rotating relative to the second housing, so that the seat reclining device is locked. As a result, the seat back is locked in position relative to the seat cushion.

In the seat reclining device, the second housing (guide) is constructed to receive the first housing (ratchet) therein. That is, the first and second housings are respectively constructed such that a peripheral edges of the second housing can circumferentially encircle a peripheral edge of the first housing when they are mated or coupled to each other.

In order to assemble the seat reclining device using a manufacturing machine, the slide cam and the slide pawls are attached to the second housing (guide). Thereafter, the first housing (ratchet) is placed on the second housing, so that the first and second housings are mated or coupled to each other. At this time, the peripheral edge of the first housing can be encircled by the peripheral edge of the second housing. Subsequently, the clip ring is placed on the first housing. In particular, the clip ring is a shouldered annular steel ring and has a first annular retainer portion (a first annular support wall), a second enlarged annular retainer portion (a second annular support wall) and a foldable annular periphery (a fixing portion). Therefore, the clip ring is placed on the first housing such that the first and second annular retainer portions of the clip ring respectively contact an outer annular surface of the peripheral edge of the first housing and an inner annular surface of the peripheral edge of the second housing. Finally, a peripheral edge of the foldable annular periphery of the clip ring thus positioned is circumferentially bent onto an outer annular surface of the peripheral edge of the second housing by crimping. Thus, the clip ring is fixed to the peripheral edge of the second housing while the peripheral edge of the first housing is held by the first annular retainer portion thereof, so that the first and second housings can be circumferentially fastened or clamped to each other.

Generally, the peripheral edge of the foldable annular periphery of the clip ring is bent onto the outer annular surface of the peripheral edge of the second housing by crimping while the second annular retainer portion of the clip ring is circumferentially supported by a support member (a support die). That is, the second annular retainer portion of the clip ring is utilized as a support surface supported by the support member when the clip ring is crimped. However, the clip ring may generally be formed by circumferentially bending a cylindrical steel ring, so as to have the first and second annular retainer portions. Therefore, an annular curved bent portion can be inherently formed between the second annular retainer portion and the foldable annular periphery. As a result, the second annular retainer portion of the clip ring has a reduced area. That is, an area of the support surface (the second annular retainer portion) supported by the support member is narrowed or reduced. This means that the second annular retainer portion of the clip ring cannot be sufficiently supported by the support member when the clip ring is crimped. This may lead to reduced accuracy of bending (crimping).

SUMMARY OF THE INVENTION

For example, in one aspect of the present invention, a connecting device that is capable of rotatably connecting a first component and a second component of a vehicle seat may include first and second connecting elements that are axially oppositely coupled to each other so as to be rotatable relative to each other, and a retainer member that is arranged and constructed to clamp the first and second connecting elements, thereby preventing the first and second connecting elements from being axially separated from each other. The first and second connecting elements are arranged and constructed to be switched between a condition in which the first and second connecting elements can rotate relative to each other and a condition in which the first and second connecting elements can be prevented from rotating relative to each other. The second connecting element has a plurality of radially projected portions and a plurality of radially depressed portions that are respectively formed in a circumferential end surface thereof. The retainer member has a first retainer portion that is capable of axially contacting an outer surface of a circumferential periphery of the first connecting element, a second retainer portion that is capable of axially contacting an inner surface of a circumferential periphery of the second connecting element, a plurality of fixing portions that are axially projected from the second retainer portion toward the circumferential end surface of the second connecting element, and a plurality of supplemental retainer portions that are radially projected from the second retainer portion and are capable of axially contacting the radially projected portions of the second connecting element. The retainer member is positioned such that the fixing portions can engage the radially depressed portions of the second connecting element. End peripheries of the fixing portions are radially crimped, thereby forming a third retainer portion that is capable of axially contacting an outer surface of the circumferential periphery of the second connecting element. The supplemental retainer portions are arranged and constructed to be axially supported by a support die of a crimping machine when the end peripheries of the fixing portions are crimped while the second retainer portion is axially supported by the support die.

According to the connecting device thus constructed, when the second retainer portion of the retainer member is axially supported by the support die of the crimping machine in order to crimp the end peripheries of the fixing portions, the supplemental retainer portions formed in the second retainer portion can be simultaneously axially supported by the support die. Therefore, even if the second retainer portion is radially diminished or reduced, the retainer member (the second retainer portion) can be reliably axially supported by the support die due to the supplemental retainer portions when the end peripheries of the fixing portions are crimped. This may lead to increased accuracy of crimping.

Optionally, the supplemental retainer portions may preferably be shaped so as to extend in the same plane as the second retainer portion.

Further, the fixing portions and the supplemental retainer portions may preferably be respectively alternately positioned at equal intervals.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Detailed representative embodiments of the present invention are shown in FIG. 1 to FIG. 20.

First Detailed Representative Embodiment

A first detailed representative embodiment of the present invention will be described with reference to FIGS. 1 to 8.

Figure 2:
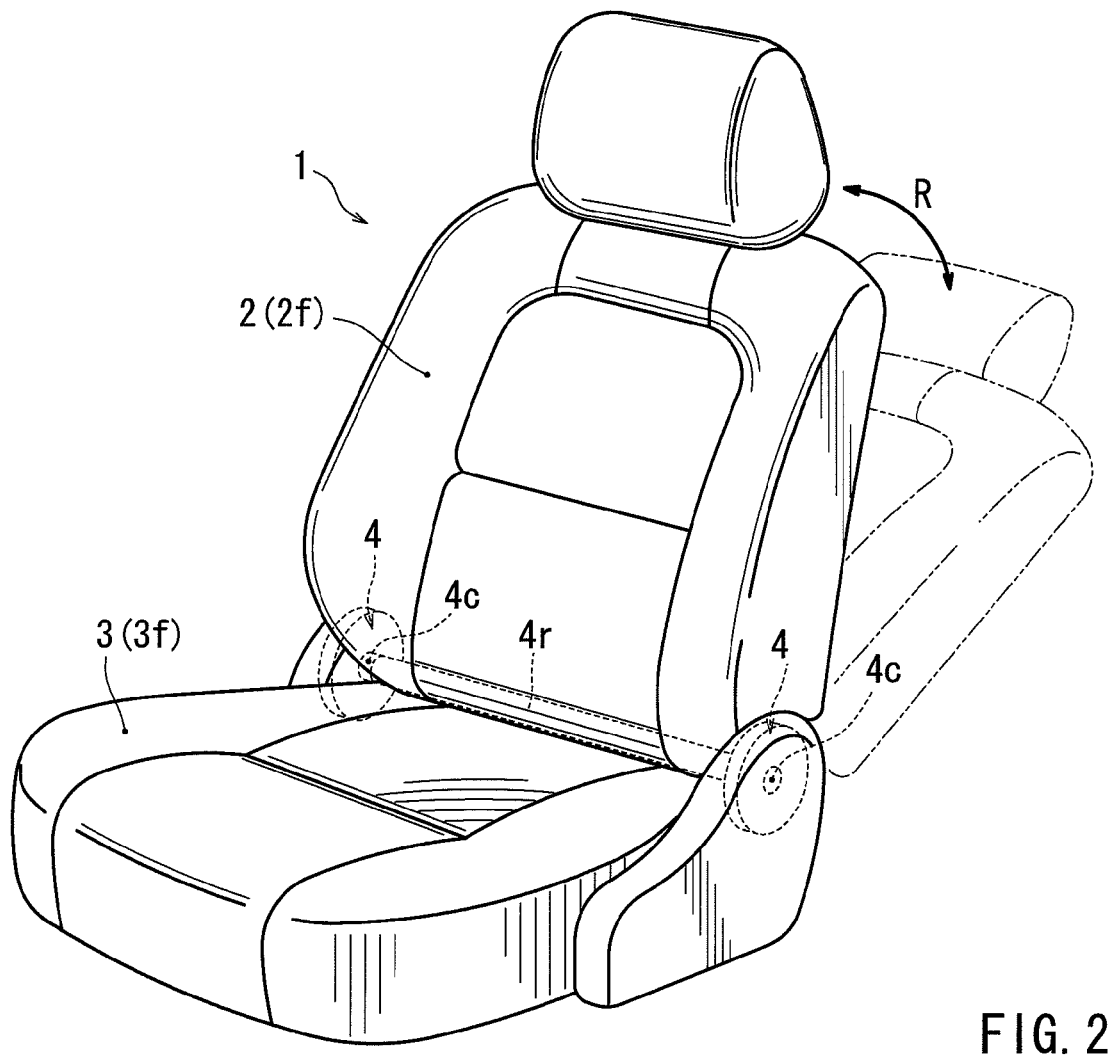
FIG. 2 is a perspective view of a vehicle seat having the reclining device.

As shown in FIG. 2, a representative vehicle seat 1 may preferably be arranged as a driver's seat of a vehicle and include a seat back 2 and a seat cushion 3. The seat back 2 and the seat cushion 3 are respectively connected by a pair of reclining devices 4 (connecting devices) that are disposed on both sides in their width direction.

The reclining devices 4 respectively have operating shafts 4c that are positioned at centers of the reclining devices 4. The operating shafts 4c are respectively connected to an elongated connection member 4r that is disposed therebetween, so that their axial rotating motions can be mutually transmitted therebetween. Thus, the operating shafts 4c can be integrally rotated. Further, an electric motor (not shown) is connected to one of the operating shafts 4c, so as to rotate the operating shafts 4c when the electric motor is rotated (actuated). The electric motor is constructed to be turned on and off and to be changed in rotational direction by operating a switch (not shown) that is attached to a side portion of the seat cushion 3.

Each of the reclining devices 4 is constructed to be switched between a normal or inoperable condition in which the tilting angle of the seat back 2 can be fixedly maintained and an operable condition in which a tilting angle of the seat back 2 can be adjusted. Switching between the inoperable condition and the operable condition of the reclining device 4 can be performed by simply turning on or off the electric motor. As will be appreciated, because the operating shafts 4c of the reclining devices 4 can be integrally connected to each other via the connection member 4r, the switching between the inoperable condition and the operable condition of the reclining devices 4 can be simultaneously or synchronously performed when the electric motor is operated.

When the electric motor is turned off, the reclining device 4 is in the inoperable condition in which the operating shaft 4c is not rotated (immobilized). In the inoperable condition of the reclining device 4, the seat back 2 is maintained in an unrotatable condition in which the tilting angle thereof is fixed to a desired angle. To the contrary, when the electric motor is turned on, the reclining device 4 is switched to the operable condition in which the operating shafts 4c can be rotated. In the operable condition of the reclining device 4, the seat back 2 can be tilted forwardly and backwardly over a rotational range (shown by a two-headed arrow R in FIG. 2) by rotating the electric motor in a normal direction or a reverse direction (i.e., by rotating the operating shaft 4c forwardly or backwardly), so that the tilting angle of the seat back 2 can be adjusted. Naturally, when the electric motor is turned off after adjustment, the reclining device 4 is switched to the inoperable condition, so that the tilting angle of the seat back 2 can be fixed to an adjusted angle.

Next, structure of each of the reclining devices 4 will now be described.

As will be appreciated, the reclining devices 4 respectively have the substantially same construction as each other with the exception of one aspect that they are formed so as to be exactly opposite to each other. Therefore, the reclining device 4 that is disposed on the left side of the vehicle seat 1 (which correspond to the right side in FIG. 2) will be described hereinafter.

Figure 1:
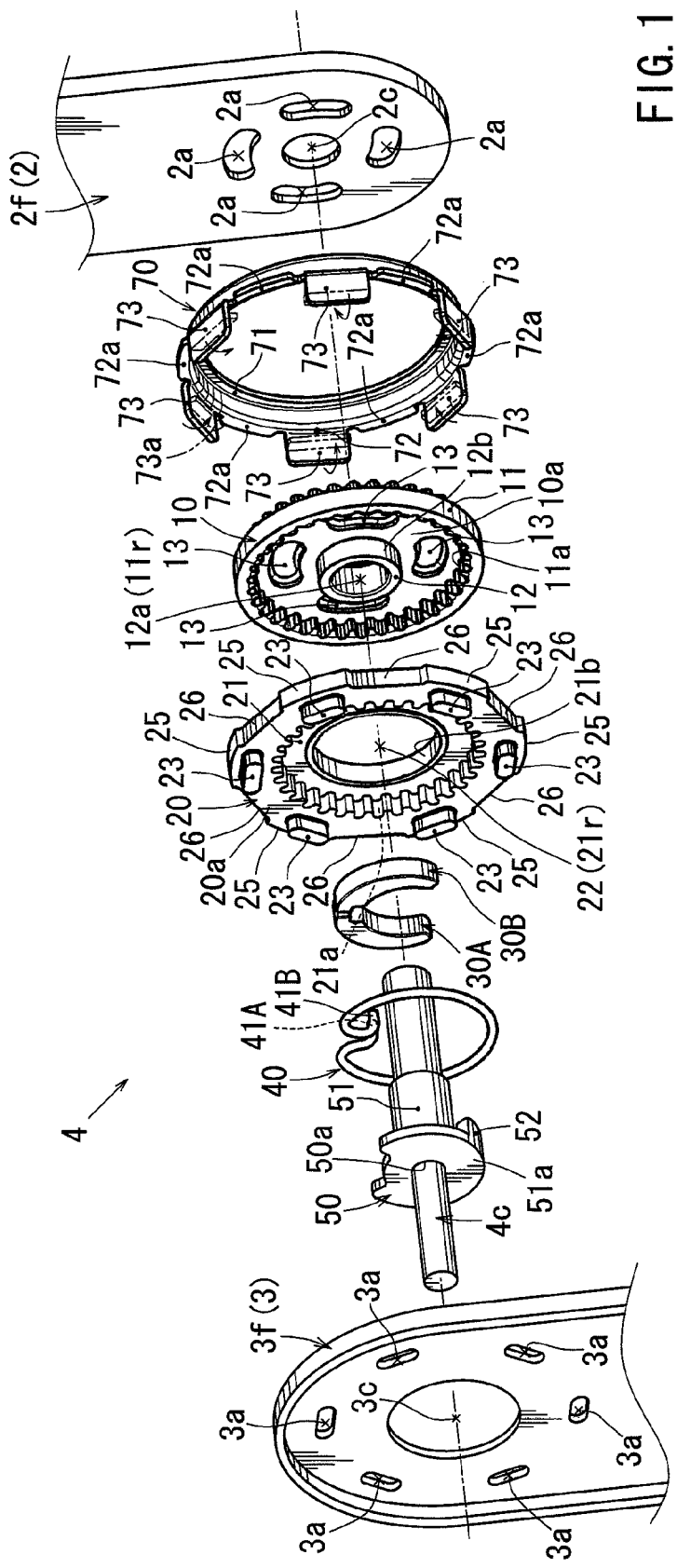
FIG. 1 is an exploded perspective view of a reclining device according to a first representative embodiment of the present invention.

As shown in FIG. 1, the reclining device 4 includes a disk-shaped internal gear member 10 (a rotational member or a first connecting element), a disk-shaped external gear member 20 (a stationary member or a second connecting element), a pair of pusher members (pusher pieces) 30A and 30B, an open ring-shaped spring member 40, an operating member 50 that is attached to (journaled on) the operating shaft 4c, and a clip ring 70 (a retainer member).

The internal gear member 10 is constructed to be affixed to a back frame 2f (a first or movable component) of the seat back 2. Further, the internal gear member 10 may preferably be formed by half die cutting a circular sheet material or sheet blank (not shown). Conversely, the external gear member 20 is constructed to be affixed to a cushion frame 3f (a second or immovable component) of the seat cushion 3. Similar to the internal gear member 10, the external gear member 20 may preferably be formed by half die cutting a circular sheet material or sheet blank (not shown).

As shown in FIG. 1, the internal gear member 10 has a disk-shaped base portion 10a, an annular wall portion 11 and a cylindrical portion 12. The annular wall portion 11 is integrally formed in the base portion 10a so as to be projected from a circumferential periphery of the base portion 10a in an axial direction (in a thickness direction). The annular wall portion 11 of the internal gear member 10 includes inwardly-faced teeth 11a that are formed in an inner circumferential surface thereof. That is, the annular wall portion 11 may function as an internal gear wheel. The cylindrical portion 12 is integrally formed in the base portion 10a so as to be axially projected from a central portion of the base portion 10a. The cylindrical portion 12 is projected in the same direction as the annular wall portion 11.

The cylindrical portion 12 has a shaft insertion bore 12a having a circular shape in cross section. As will be appreciated, the shaft insertion bore 12a is shaped such that the operating shaft 4c can be inserted therethrough. The shaft insertion bore 12a may preferably be formed so as to be positioned coaxially with the annular wall portion 11. That is, the shaft insertion bore 12a may preferably has an axis that is aligned with an axis 11r of the annular wall portion 11.

Further, the internal gear member 10 has a plurality of (four in this embodiment) engagement projections or dowels 13. The dowels 13 are respectively formed in the base portion 10a so as to be projected in a direction opposite to the wall portion 11. The dowels 13 may preferably be positioned along the wall portion 11 at equal intervals. Further, each of the dowels 13 has an oval shape that is extended in a circumferential direction of the base portion 10a.

Further, as shown in FIG. 1, the shaft insertion bore 12a and the dowels 13 may preferably be positioned so as to correspond to a through hole 2c and a plurality of (four in this embodiment) oval dowel insertion holes 2a that are respectively formed in the back frame 2f. Therefore, the internal gear member 10 can be attached to the back frame 2f by fitting the dowels 13 into the dowel insertion holes 2a. At this time, the shaft insertion bore 12a can be aligned with the through hole 2c. Further, the internal gear member 10 may preferably be affixed to the back frame 2f by welding.

As described above, each of the dowels 13 is shaped to be extended in the circumferential direction of the internal gear member 10. Therefore, each of the dowels 13 has increased shear strength in the circumferential direction of the internal gear member 10. In addition, the dowels 13 can be connected to the back frame 2f in a large area. As a result, the internal gear member 10 can be rigidly attached to the back frame 2f.

As shown in FIG. 1, the external gear member 20 has a disk-shaped base portion 20a and a cylindrical portion 21. The disk-shaped base portion 20a has a diameter greater than the diameter of the internal gear member 10. The cylindrical portion 21 is integrally formed in the base portion 20a so as to be axially projected from a central portion of the base portion 20a in an axial direction (in a thickness direction). Further, the cylindrical portion 21 is projected in a direction opposite to the cylindrical portion 12 of the internal gear member 10. The cylindrical portion 21 of the external gear member 20 includes outwardly-faced teeth 21a that are formed in an outer circumferential surface thereof. That is, the cylindrical portion 21 may function as an external gear wheel.

The cylindrical portion 21 has a diameter smaller than an inner diameter of the annular wall portion 11 of the internal gear member 10. Further, the teeth 21a formed in the cylindrical portion 21 are capable of meshing with the teeth 11a formed in the annular wall portion 11 of the internal gear member 10. However, the number of the teeth 21a is set to be fewer than the number of the teeth 11a. In particular, the number of the teeth 21a is thirty three (33) whereas the number of the teeth 11a is thirty four (34).

Further, the cylindrical portion 21 has an enlarged opening 22 having a circular shape in cross section. The opening 22 has a diameter greater than an outer diameter of the cylindrical portion 12 of the internal gear member 10. The opening 22 may preferably be formed so as to be positioned coaxially with the cylindrical portion 21. That is, the opening 22 may preferably has an axis that is aligned with an axis 21r of the cylindrical portion 21 (the external gear wheel).

Figure 5:
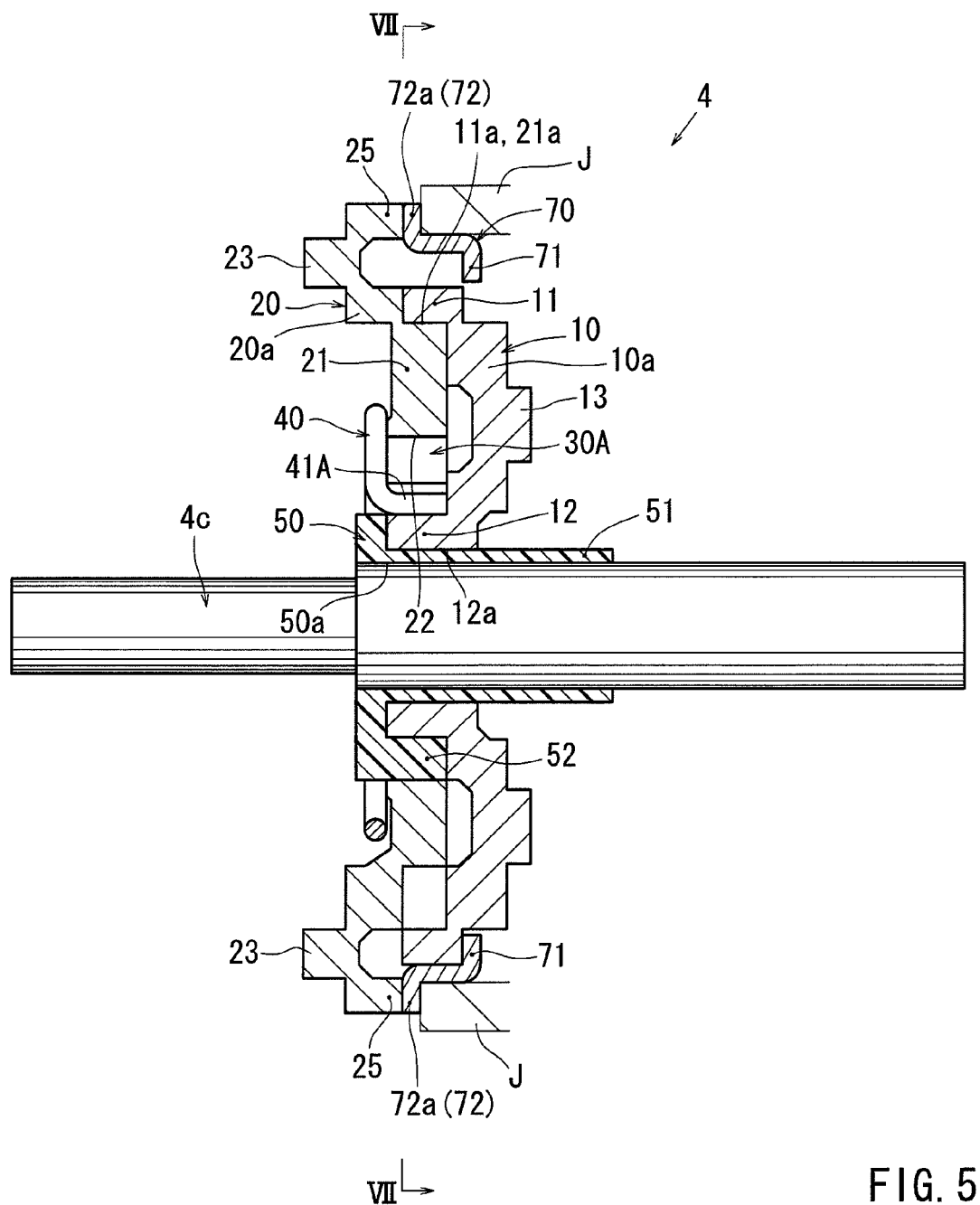
FIG. 5 is a cross-sectional view taken along line V-V in FIG. 3, which schematically illustrates a process for crimping a clip ring using a crimping machine having a support die and a crimping die.
Figure 6:
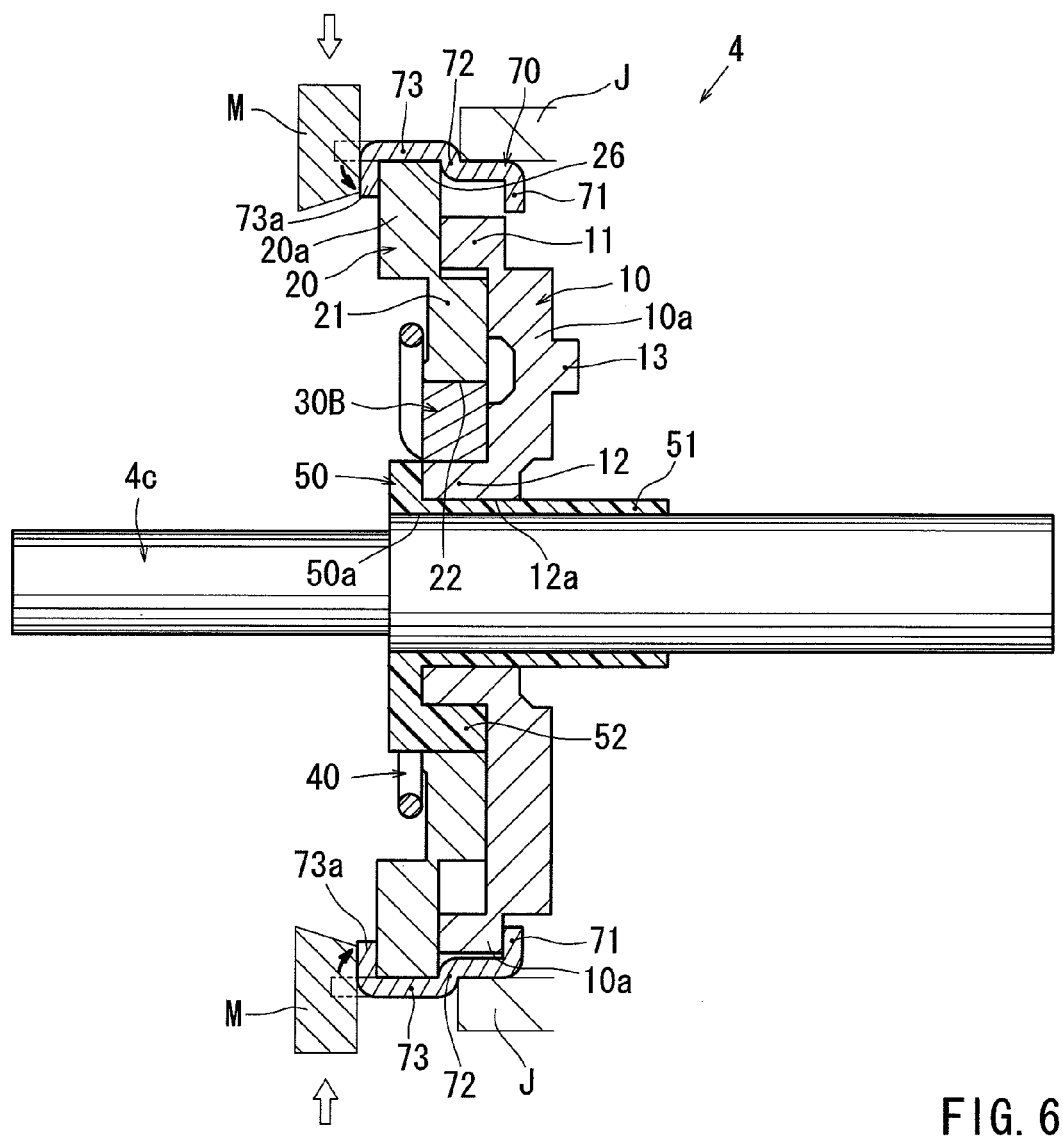
FIG. 6 is a cross-sectional view taken along line VI-VI in FIG. 3, which schematically illustrates the process for crimping the clip ring using the crimping machine.
Figure 7:
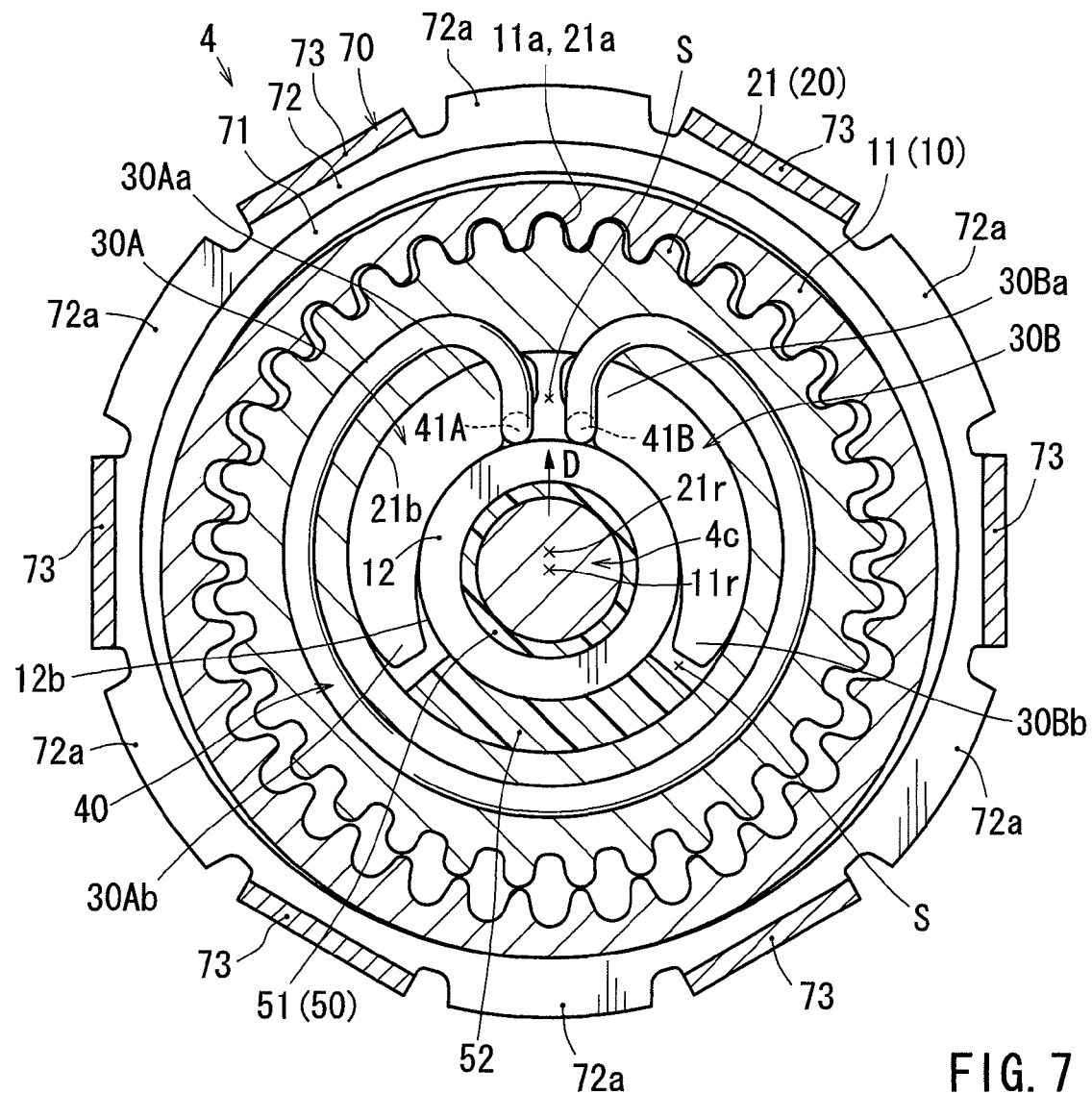
FIG. 7 is a cross-sectional view taken along line VII-VII in FIG. 6, which illustrates a condition in which the reclining device is in an inoperable condition.
Figure 8:
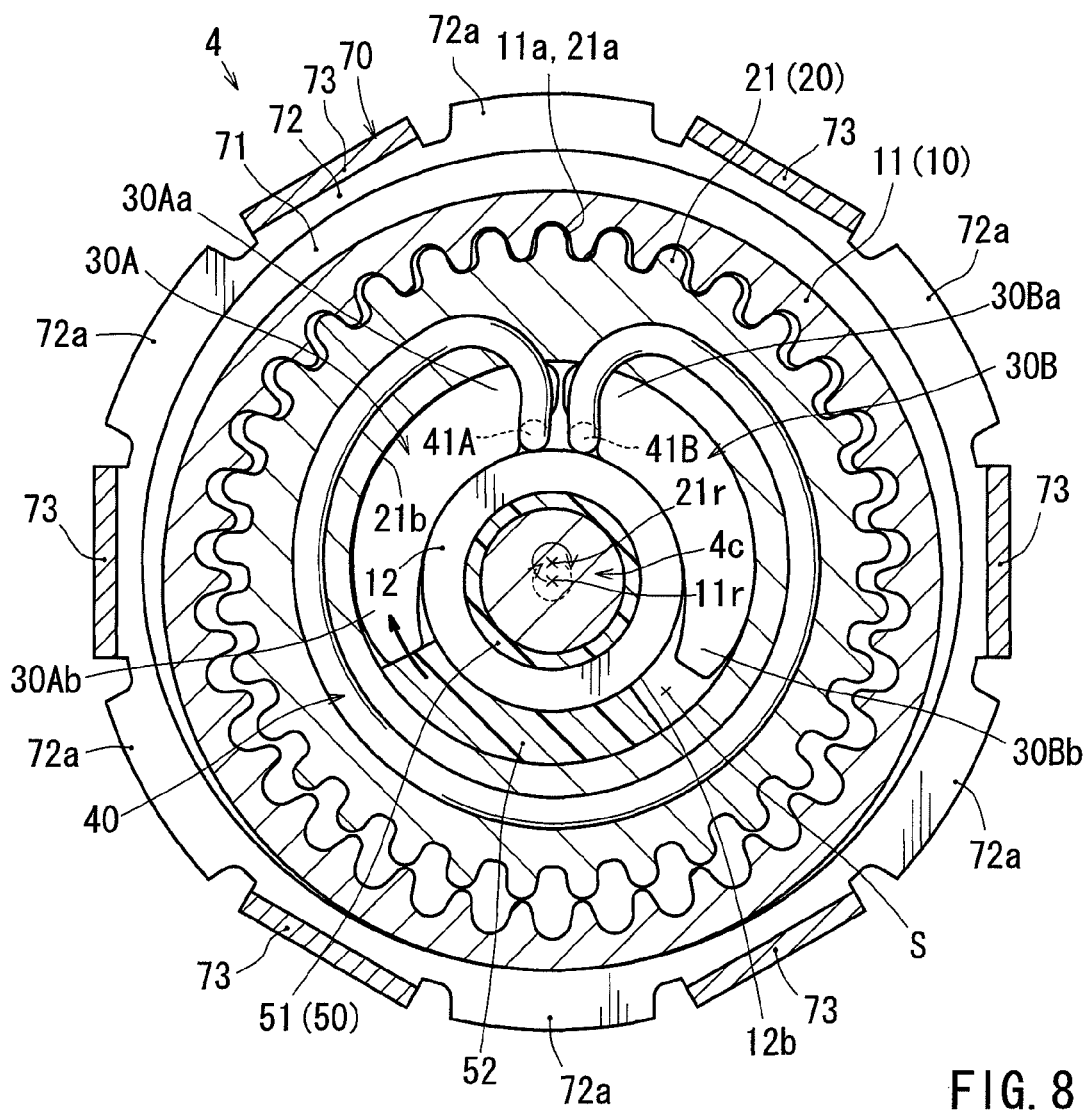
FIG. 8 is a cross-sectional view taken along line VII-VII in FIG. 6, which illustrates a condition in which the reclining device is in an operable condition.

As shown in FIGS. 5 and 6, the external gear member 20 thus constructed can be coupled to the internal gear member 10 while the cylindrical portion 12 of the internal gear member 10 is positioned within the opening 22 of the cylindrical portion 21. Further, as shown in FIGS. 7 and 8, the external gear member 20 can be coupled to the internal gear member 10 while the axis 21r of the cylindrical portion 21 is offset or deviated from the axis 11r of the annular wall portion 11. In other words, the external gear member 20 can be coupled to the internal gear member 10 while the teeth 21a formed in the cylindrical portion 21 partially mesh with the teeth 11a formed in the annular wall portion 11 of the internal gear member 10. As a result, when the external gear member 20 is coupled to the internal gear member 10, formed within the opening 22 is a nonuniform annular space S that is defined by an inner circumferential surface 21b of the cylindrical portion 21 and an outer circumferential surface 12b of the cylindrical portion 12.

Further, the external gear member 20 has a plurality of (six in this embodiment) radially projected portions 25 and a plurality of (six in this embodiment) radially depressed portions 26. The radially projected portions 25 and the radially depressed portions 26 are respectively formed in a circumferential end surface of the base portion 20a, so as to be alternately positioned at equal intervals.

As shown in FIG. 1, the external gear member 20 has a plurality of (six in this embodiment) engagement projections or dowels 23. The dowels 23 are respectively formed in the base portion 20a so as to be projected in a direction opposite to the cylindrical portion 21. The dowels 23 may preferably be positioned along a circumferential periphery of the base portion 20a at equal intervals, so as to respectively be adjacent to the radially projected portions 25. Further, each of the dowels 23 has an oval shape that is extended in a circumferential direction of the base portion 20a.

Further, as shown in FIG. 1, the opening 22 and the dowels 23 may preferably be positioned so as to correspond to an enlarged through hole 3c and a plurality of (six in this embodiment) oval dowel insertion holes 3a that are respectively formed in the cushion frame 3f. Therefore, the external gear member 20 can be attached to the cushion frame 3f by fitting the dowels 23 into the dowel insertion holes 3a. At this time, the opening 22 can be aligned with the through hole 3c. Further, the external gear member 20 may preferably be affixed to the cushion frame 3f by welding.

As described above, each of the dowels 23 is shaped so as to be extended in the circumferential direction of the external gear member 20. Therefore, each of the dowels 23 has increased shear strength in the circumferential direction of the external gear member 20. In addition, the dowels 23 can be connected to the cushion frame 3f in a large area. As a result, the external gear member 20 can be rigidly attached to the cushion frame 3f.

As best shown in FIGS. 7 and 8, the pusher members 30A and 30B are symmetrically shaped. Each of the pusher members 30A and 30B is shaped so as to be closely fitted into the nonuniform annular space S formed in the opening 22. In particular, the pusher members 30A and 30B are respectively arcuately shaped and include thickened end portions 30Aa and 30Ba and thinned end portions 30Ab and 30Bb. Further, the pusher members 30A and 30B are respectively shaped so as to be fitted into the annular space S while the thickened end portions 30Aa and 30Ba thereof are positioned opposite to each other.

As shown in FIGS. 7 and 8, the spring member 40 has engagement end portions 40A and 40B. The spring member 40 can be attached to the pusher members 30A and 30B while the engagement end portions 40A and 40B respectively engage the thickened end portions 30Aa and 30Ba of the pusher members 30A and 30B. Further, the spring member 40 is constructed to normally circumferentially press the pusher members 30A and 30B in such a direction in which the thickened end portions 30Aa and 30Ba are spaced from each other when it is attached thereto.

Therefore, in a condition that the spring member 40 is attached to the pusher members 30A and 30B, due to a spring force of the spring member 40, the external gear member 20 (the cylindrical portion 21) can normally be outwardly biased with respect to the cylindrical portion 12 of the internal gear member 10 in such a direction in which the axis 21r of the cylindrical portion 21 is deviated with respect to the axis 11r of the annular wall portion 11 (i.e., a direction shown by an arrow D in FIG. 7). As a result, the cylindrical portion 21 can be pressed to the annular wall portion 11 of the internal gear member 10, so that the teeth 21a formed in the cylindrical portion 21 can reliably mesh with the teeth 11a formed in the annular wall portion 11 without producing backrush therebetween. Therefore, the external gear member 20 and the internal gear member 10 can be maintained so as to be prevented from being rotated relative to each other.

As shown in FIG. 1, the operating member 50 is attached and secured to the operating shaft 4c so as to be integrally rotated therewith. In particular, the operating member 50 is attached to (journaled on) the operating shaft 4c while a serrated portion (not shown) formed in an insertion bore 50a thereof engages a corresponding serrated portion (not shown) formed in an outer surface of the operating shaft 4c.

The operating member 50 includes a cylindrical portion 51 and a collar portion 51a radially projected from the cylindrical portion 51. The collar portion 51a has an arm portion 52 that is projected along the cylindrical portion 51. As shown in FIG. 7, the operating member 50 is arranged and constructed such that the arm portion 52 is movably fitted into the annular space S formed between the thinned end portions 30Ab and 30Bb of the pusher members 30A and 30B when the operating shaft 4c (the cylindrical portion 51 of the operating member 50) is inserted into the shaft insertion bore 12a of the cylindrical portion 12 after the external gear member 20 is coupled to the internal gear member 10. Therefore, as shown in FIG. 8, for example, when the operating member 50 (the operating shaft 4c) is rotated clockwise by the arm portion 52, the thinned end portions 30Ab can be pressed clockwise, so that the pusher member 30A can be rotated clockwise against the spring force of the spring member 40. At the same time, the pusher member 30B can be rotated clockwise by the spring force of the spring member 40.

Upon clockwise rotation of the pusher members 30A and 30B, the inner circumferential surface 21b of the cylindrical portion 21 can be sequentially pressed outwardly by the thickened end portions 30Aa and 30Ba of the pusher members 30A and 30B. As a result, the cylindrical portion 21 can relatively move clockwise along the inner circumferential surface of the annular wall portion 11 while the teeth 21a formed in the cylindrical portion 21 sequentially mesh with the teeth 11a formed in the annular wall portion 11. That is, the cylindrical portion 21 can relatively move clockwise while the axis 21r of the cylindrical portion 21 rotates around the axis 11r of the annular wall portion 11.

When the rotation of the operating member 50 (the operating shaft 4c) is stopped, the rotation of the pusher members 30A and 30B is also stopped. As a result, the pusher members 30A and 30B can be circumferentially pressed by the spring member 40 in such a direction in which the thickened end portions 30Aa and 30Ba are spaced from each other. Thus, the cylindrical portion 21 can be prevented from relatively moving clockwise along the inner circumferential surface of the annular wall portion 11.

Figure 3:
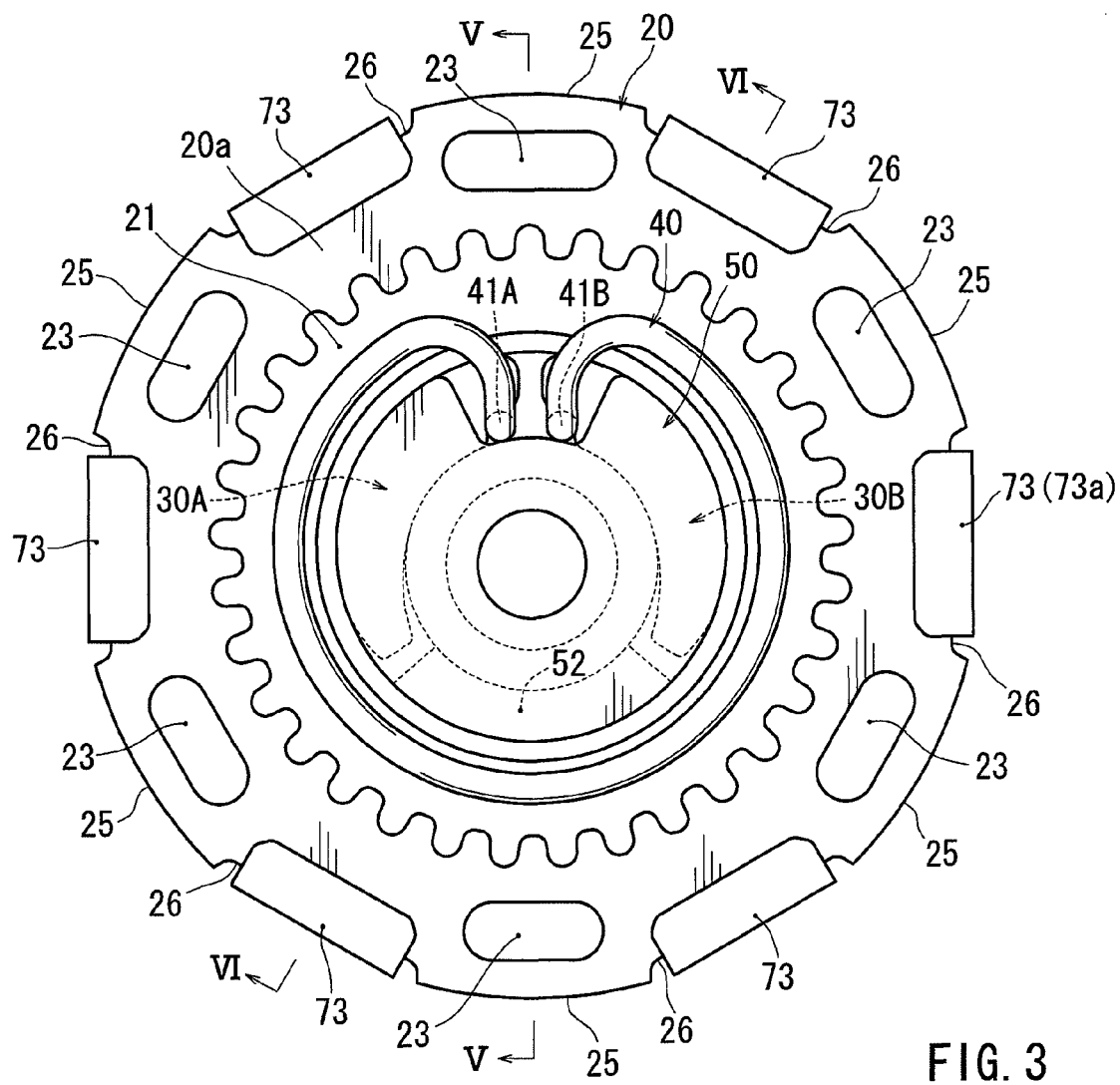
FIG. 3 is an enlarged side view of the reclining device, which is viewed from one side thereof.
Figure 4:
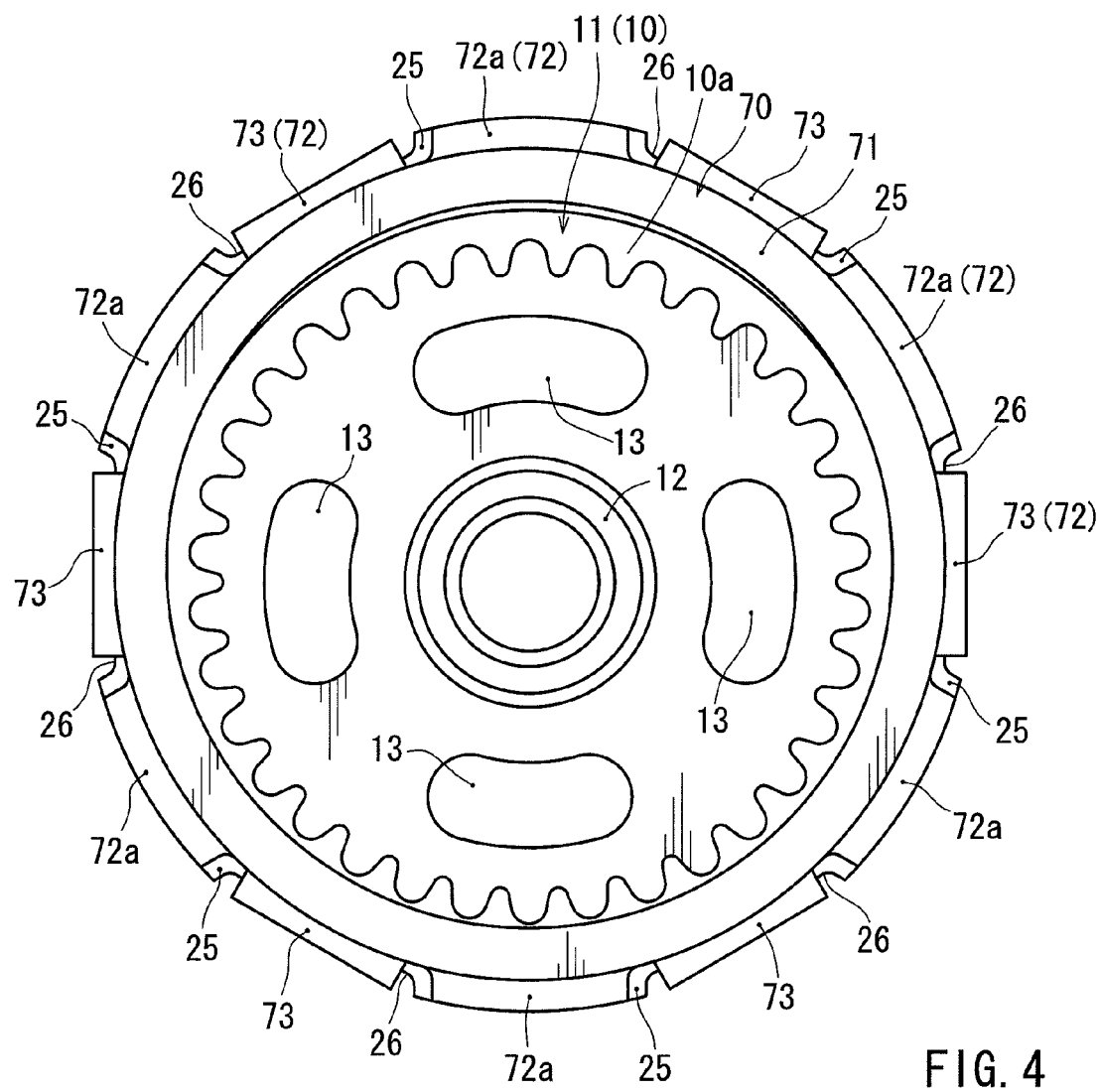
FIG. 4 is an enlarged side view of the reclining device, which is viewed from the other side thereof.

The clip ring 70 is arranged and constructed to relatively rotatably fasten or clamp the internal and external gear members 10 and 20 that are axially oppositely mated or coupled to each other. As shown in FIG. 1, the clip ring 70 is a shouldered annular steel ring and has a first annular support wall 71 (a first retainer portion) and a second enlarged annular support wall 72 (a second retainer portion). Formed in the second support wall 72 are a plurality of (six in this embodiment) foldable strips 73 (fixing portions) that are axially projected therefrom. As shown in FIGS. 1, 3 and 4, the foldable strips 73 may preferably be positioned at equal intervals, so as to engage the radially depressed portions 26 of the external gear member 20 when the clip ring 70 is attached to the internal and external gear members 10 and 20. Further, as shown in FIGS. 3 and 4, each of the foldable strips 73 may preferably be shaped so as to have the substantially same height as the radially projected portions 25 when it engages the radially depressed portions 26.

Further, integrally formed in the second support wall 72 are a plurality of (six in this embodiment) supplemental support walls 72a (supplemental retainer portions) that are radially projected therefrom. As shown in FIGS. 1 and 4, the supplemental support walls 72a may preferably be positioned at equal intervals, so as to correspond to the radially projected portions 25 of the external gear member 20 when the clip ring 70 is attached to the internal and external gear members 10 and 20. In other words, the supplemental support walls 72a may preferably be positioned between the foldable strips 73. Further, as best shown in FIG. 4, each of the supplemental support walls 72a may preferably be formed so as to extend in the same plane as the second support wall 72. In addition, each of the supplemental support walls 72a may preferably be shaped such that a peripheral end surface thereof can be flush with a peripheral end surface of the radially projected portions 25 when the clip ring 70 is attached to the internal and external gear members 10 and 20.

As described above, the supplemental support walls 72a are respectively formed so as to extend in the same plane as the second support wall 72. Therefore, as shown in FIG. 5, when the clip ring 70 is attached to the internal and external gear members 10 and 20, the supplemental support walls 72a can respectively axially contact the radially projected portions 25 formed in the circumferential periphery of the base portion 20a of the external gear member 20 while the second support wall 72 axially contacts an inner surface of the circumferential periphery of the base portion 20a. Conversely, as shown in FIGS. 5 and 6, the first support wall 71 axially partially contacts an outer surface of the circumferential periphery of the base portion 10a of the internal gear members 10 when the clip ring 70 is attached to the internal and external gear members 10 and 20. Therefore, the clip ring 70 can be reliably positioned with respect to the internal and external gear members 10 and 20. Thus, when the clip ring 70 is attached to the internal and external gear members 10 and 20, the first and second support walls 71 and 72 and the supplemental support wall 72a of the clip ring 70 may function as positioning surfaces for the internal and external gear members 10 and 20.

Next, a manufacturing process of the reclining device 4 will be described.

As shown in FIGS. 5 and 6, after internal and external gear members 10 and 20 are axially coupled to each other, the operating shaft 4c (the cylindrical portion 51 of the operating member 50) is inserted into the shaft insertion bore 12a of the cylindrical portion 12 while the pusher members 30A and 30B are fitted into the annular space S formed in the opening 22. Thereafter, the spring member 40 is attached to the pusher members 30A and 30B. The internal and external gear members 10 and 20 thus coupled are circumferentially clamped or fastened via the clip ring 70, so as to be prevented from being axially separated from each other. In particular, the clip ring 70 is positioned such that the foldable strips 73 can engage the radially depressed portions 26 of the external gear member 20. Thereafter, end peripheries of the foldable strips 73 of the clip ring 70 are radially crimped so as to be folded over an outer surface of the circumferential periphery of the base portion 20a of the external gear member 20, thereby forming retainer portions 73a (third retainer portions) that are capable of axially contacting the outer surface of the circumferential periphery of the base portion 20a. As a result, the clip ring 70 is fixed to the external gear member 20 while the internal gear member 10 is axially partially supported by the first support wall 71 of the clip ring 70, so that the internal and external gear members 10 and 20 can be fastened. Thus, the reclining device 4 can be assembled.

Further, the end peripheries of the foldable strips 73 may preferably be crimped such that the internal and external gear members 10 and 20 are relatively rotatable to each other. In particular, the end peripheries of the foldable strips 73 may preferably be crimped so as to produce small clearances between the annular wall portion 11 of the internal gear member 10 and the base portion 20a of the external gear member 20 and between the annular wall portion 11 of the internal gear member 10 and the first support wall 71 of the clip ring 70. As a result, limited sliding friction can be produced between the clip ring 70 and the internal gear member 10. Thus, the internal and external gear members 10 and 20 can be smoothly rotated relative to each other.

Further, in order to crimp the end peripheries of the foldable strips 73, a crimping machine (not shown) having a support die J and a crimping die M is used. That is, as shown in FIG. 6, after the clip ring 70 is circumferentially attached to the internal and external gear members 10 and 20, the end peripheries of the foldable strips 73 of the clip ring 70 are radially crimped by the crimping die M while the second support wall 72 of the clip ring 70 is axially supported by the support die J.

However, as described above, the second support wall 72 has the supplemental support walls 72a that are circumferentially partially formed therein. Therefore, when the second support wall 72 of the clip ring 70 is axially supported by the support die J, the supplemental support walls 72a can be simultaneously supported by the support die J (FIG. 5). That is, the clip ring 70 may have a substantial support surface that can be supported by the support die J. Therefore, when the end peripheries of the foldable strips 73 of the clip ring 70 are radially crimped by the crimping die M, the second support wall 72 of the clip ring 70 can be sufficiently axially supported by the support die J due to the supplemental support walls 72a.

Thus, in the reclining device 4 of the present embodiment, the second support wall 72 of the clip ring 70 has the supplemental support walls 72a corresponding to the radially projected portions 25 of the external gear member 20. Therefore, the second support wall 72 can have a sufficient area even if the second support wall 72 is radially diminished in order to downsize the reclining device 4. As a result, the second support wall 72 of the clip ring 70 can be reliably supported by the support die J when the clip ring 70 is crimped. This may lead to increased accuracy of crimping.

As shown in FIG. 1, the reclining device 4 thus assembled is connected to the back frame 2f and the cushion frame 3f while the operating shaft 4c is passed through the through hole 2c formed in the back frame 2f and the enlarged through hole 3c formed in the cushion frame 3f. In particular, the internal gear member 10 is attached to the back frame 2f by fitting the dowels 13 into the dowel insertion holes 2a. At the same time, the external gear member 20 is attached to the cushion frame 3f by fitting the dowels 23 into the dowel insertion holes 3a. Similarly, the reclining device 4 that is disposed on the left side of the vehicle seat 1 is connected to the back frame 2f and the cushion frame 3f. Thus, the back frame 2f and the cushion frame 3f (the seat back 2 and the seat cushion 3) are respectively connected by the two reclining devices 4.

Operation of the reclining device 4 will now be described with reference to FIGS. 7 and 8.

As shown in FIG. 7, due to the spring force of the spring member 40, the pusher members 30A and 30B is normally circumferentially pressed in such a direction in which the thickened end portions 30Aa and 30Ba thereof are spaced from each other. Therefore, the external gear member 20 (the cylindrical portion 21) is outwardly biased with respect to the cylindrical portion 12 of the internal gear member 10 in the direction in which the axis 21r of the cylindrical portion 21 is deviated with respect to the axis 11r of the annular wall portion 11 (i.e., the direction shown by an arrow D in FIG. 7). As a result, the cylindrical portion 21 can be pressed to the annular wall portion 11 of the internal gear member 10, so that the teeth 21a formed in the cylindrical portion 21 can reliably mesh with the teeth 11a formed in the annular wall portion 11. Therefore, the external gear member 20 and the internal gear member 10 can be maintained so as to be prevented from rotating relative to each other. Thus, the reclining device 4 can be maintained in a locking condition.

As shown in FIG. 8, for example, when the operating member 50 (the operating shaft 4c) is rotated clockwise, the thinned end portions 30Ab is pressed clockwise, so that the pusher member 30A is rotated clockwise against the spring force of the spring member 40. At the same time, the pusher member 30B is rotated clockwise by the spring force of the spring member 40. Thus, the reclining device 4 can be changed to an unlocking condition.

Upon clockwise rotation of the pusher members 30A and 30B, the inner circumferential surface 21b of the cylindrical portion 21 is sequentially pressed outwardly by the thickened end portions 30Aa and 30Ba of the pusher members 30A and 30B. As a result, the cylindrical portion 21 relatively moves clockwise along the inner circumferential surface of the annular wall portion 11 while the teeth 21a formed in the cylindrical portion 21 sequentially partially mesh with the teeth 11a formed in the annular wall portion 11. That is, the cylindrical portion 21 relatively moves clockwise while the axis 21r of the cylindrical portion 21 rotates around the axis 11r of the annular wall portion 11. At this time, the cylindrical portion 21 (the external gear member 20) is gradually rotated counterclockwise about the axis 21r thereof due to a difference between the number (33) of the teeth 21a and the number (34) of the teeth 11a.

However, in this embodiment, the external gear member 20 is connected to the cushion frame 3f (the immovable component). That is, the cylindrical portion 21 (the external gear member 20) can be prevented from being rotated. Conversely, the internal gear member 10 is connected to the back frame 2f (the movable component). Therefore, instead of the cylindrical portion 21 (the external gear member 20), the annular wall portion 11 of the internal gear member 10 moves clockwise along the outer circumferential surface of the cylindrical portion 21 while the teeth 11a formed in the annular wall portion 11 sequentially partially mesh with the teeth 21a formed in the cylindrical portion 21. That is, the annular wall portion 11 moves clockwise while the axis 11r thereof rotates around the axis 21r of the cylindrical portion 21. At this time, the annular wall portion 11 (the internal gear member 10) is gradually rotated counterclockwise about the axis 11r thereof due to the difference between the number (33) of the teeth 21a and the number (34) of the teeth 11a. Thus, the internal gear member 10 can rotate while moving around the external gear member 20. Upon rotation of the annular wall portion 11 (the internal gear member 10), the back frame 2f can rotate in the same manner as the internal gear member 10 because the back frame 2f is fixedly connected to the internal gear member 10. Thus, the tilting angle of the seat back 2 can be adjusted.

When the rotation of the operating member 50 (the operating shaft 4c) is stopped, the rotation of the pusher members 30A and 30B is also stopped. As a result, the pusher members 30A and 30B can be circumferentially pressed by the spring member 40 in such a direction that the thickened end portions 30Aa and 30Ba are spaced from each other. Therefore, the annular wall portion 11 can be prevented from moving clockwise. Thus, the reclining device 4 can be maintained in the locking condition again, so that the tilting angle of the set back 2 can be fixed to an adjusted tilting angle.

Second Detailed Representative Embodiment

The second detailed representative embodiment will now be described in detail with reference to FIGS. 9-17.

Figure 10:
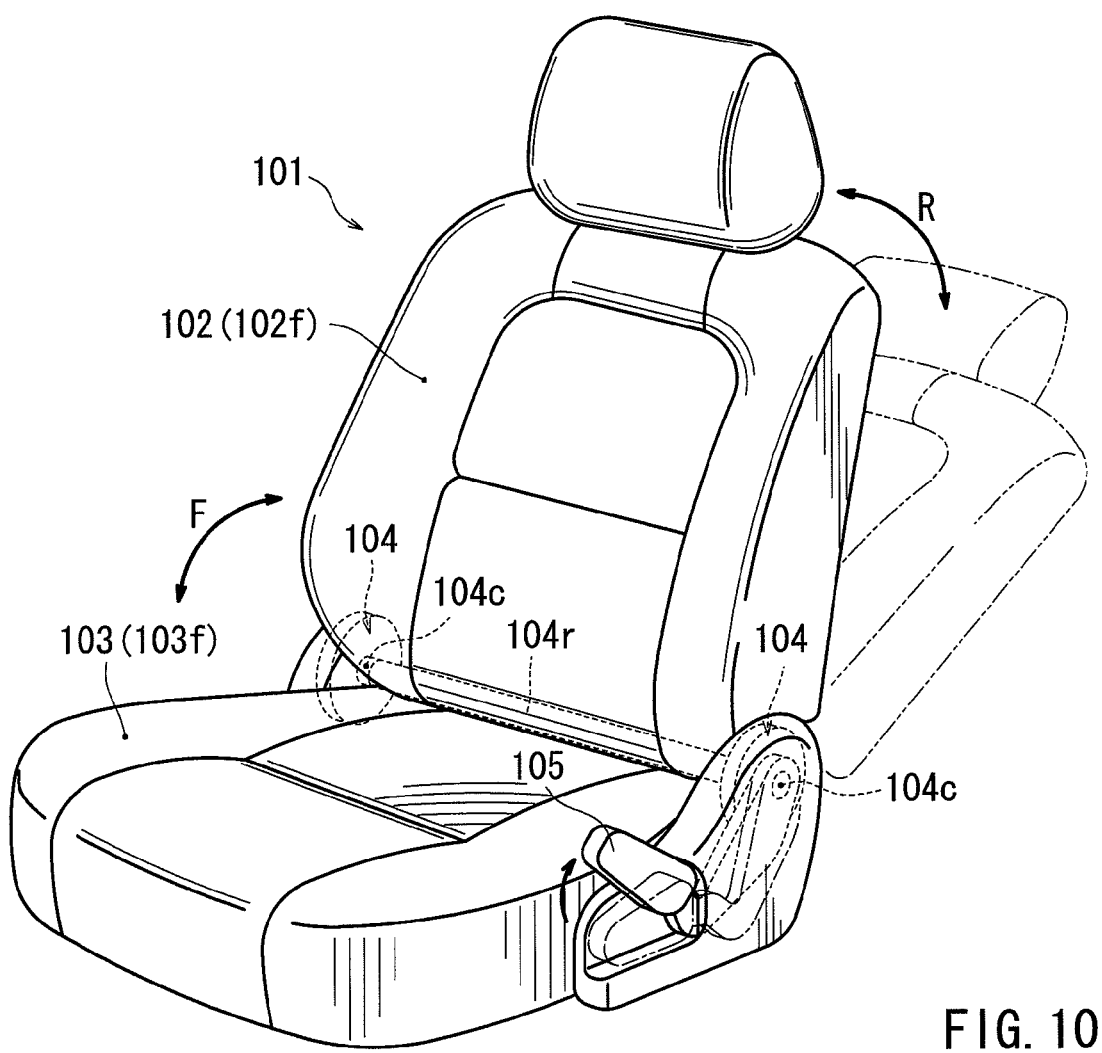
FIG. 10 is a perspective view of a vehicle seat having the reclining device.

As shown in FIG. 10, a representative vehicle seat 101 may preferably be arranged as a driver's seat of a vehicle and include a seat back 102 and a seat cushion 103. The seat back 102 and the seat cushion 103 are respectively connected by a pair of reclining devices 104 (connecting devices) that are disposed on both sides in their width direction.

The reclining devices 104 are respectively constructed so as to be switched between an unlocking condition in which a tilting angle of the seat back 102 can be adjusted and a locking condition in which the tilting angle can be fixedly maintained. Switching between the locking condition and the unlocking condition of the reclining devices 104 can be performed via rotation of operating shafts 104c that are respectively positioned at centers of the reclining devices 104. The operating shafts 104c are connected to an elongated connection member 104r that is disposed therebetween, so that their axial rotating motions can be mutually transmitted therebetween. Thus, the operating shafts 104c can be integrally axially rotated. As a result, the switching between the locking condition and the unlocking condition of the reclining devices 104 can be simultaneously or synchronously performed. Further, the reclining devices 104, in a normal condition in which the operating shafts 104c are not yet axially rotated, are biased so as to be maintained in the locking condition in which the tilting angle of the seat back 102 is fixed to a desired angle.

The reclining devices 104 can be simultaneously switched (unlocked) to the unlocking condition by lifting an operation lever 105. The operation lever 105 is attached to a side portion of the seat cushion 103 and is linked to the connection member 104r (the operating shafts 104c). When the reclining devices 104 are unlocked, as shown by solid and broken lines in FIG. 10, the seat back 102 can be tilted forwardly and backwardly, so that the tilting angle thereof can be adjusted. When the lever 105 is released after the tilting angle of the seat back 102 is adjusted, the reclining devices 104 are respectively returned to the locking condition, so that the tilting angle of the set back 102 can be fixedly maintained to an adjusted tilting angle.

The seat back 102 is normally biased forwardly via a biasing spring (not shown) that is disposed between the seat back 102 and the seat cushion 103. Therefore, when the reclining devices 104 are unlocked while a passenger does not sit on the vehicle seat 101, the seat back 102 can be automatically rotated forwardly, so as to be folded on the seat cushion 103.

Further, each of the reclining devices 104 has a lockable rotational region and an unlockable (free) rotational region. In the lockable rotational region, the reclining device 104 can be placed in the locking condition when the lever 105 is released. Conversely, in the unlockable rotational region, the reclining device 104 cannot be placed in the locking condition even when the lever 105 is released.

Generally, the lockable rotational region of the reclining device 104 may preferably be determined so as to correspond to a rotational range between a normal position (a substantially vertical position) and a farthest rearward rotational position of the seat back 102 (i.e., a rearward rotational range of the seat back 102 shown by a two-headed arrow R in FIG. 10). Conversely, the unlockable rotational region of the reclining device 104 may preferably be determined so as to correspond to a rotational range between the normal position and a farthest forward rotational position (a folded position) of the seat back 102 (i.e., a forward rotational range of the seat back 102 shown by a two-headed arrow F in FIG. 10).

Therefore, when the reclining devices 104 are unlocked by lifting the lever 105 while the seat back 102 is in the substantially vertical position (e.g., a position shown by solid lines in FIG. 10), the seat back 102 can be automatically rotated forwardly by a biasing force of the biasing spring until it is folded on the seat cushion 103 even when the lever 105 is released. Conversely, after the reclining devices 104 are unlocked by lifting the lever 105 while the seat back 102 is in the substantially vertical position, when the seat back 102 is rotated rearwardly against the biasing force of the biasing spring so as to adjust the tilting angle thereof, the tilting angle of the seat back 102 can be fixed to the adjusted tilting angle by releasing the lever 105.

As will be appreciated, the reclining devices 104 respectively have the substantially same construction as each other with the exception of one aspect that they are formed so as to be exactly opposite to each other. Therefore, the reclining device 104 that is disposed on the left side of the vehicle seat 101 (which correspond to the right side in FIG. 10) will be described hereinafter.

Figure 9:
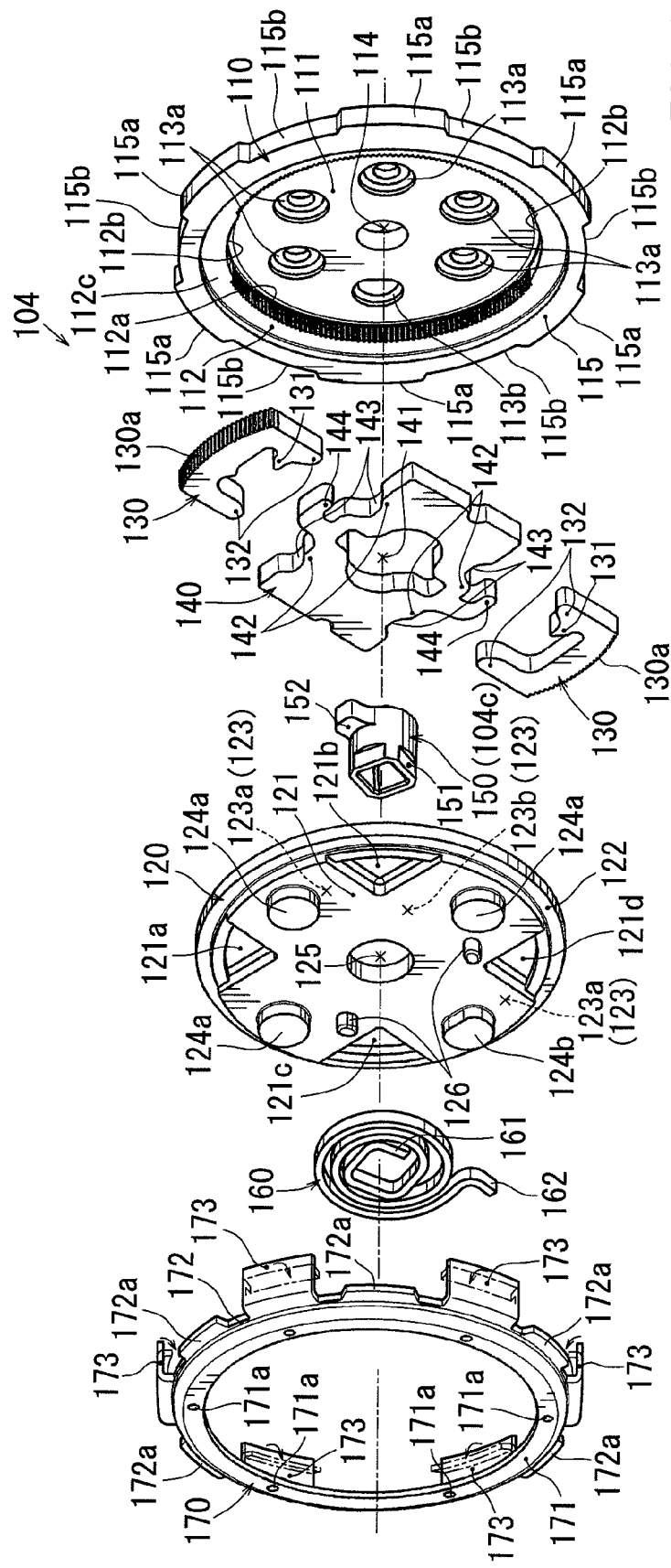
FIG. 9 is an exploded perspective view of a reclining device according to a second representative embodiment of the present invention.

As shown in FIG. 9, the reclining device 104 includes an outer shell that is constructed from a pair of opposing dish-shaped housings, i.e., a first or rotational housing 110 (a ratchet or a second connecting element) and a second or stationary housing 120 (a guide or a first connecting element). The first and second housings 110 and 120 are axially oppositely mated or coupled to each other and are relatively rotatably fastened or clamped by a clip ring 170 (a retainer member) that is circumferentially attached thereto.

The first housing 110 is constructed to be affixed to a back frame 102f (a first component) of the seat back 102. Conversely, the second housing 120 is constructed to be affixed to a cushion frame 103f (a second component) of the seat cushion 103. The first and second housings 110 and 120, when coupled to each other, define an inner receiving space therebetween that is capable of receiving a slide cam 140 (an operating member), a pair of slide pawls 130 (locking members), an operating member 150 (a hinge cam) and a spirally shaped spring 160 therein.

Figure 13:
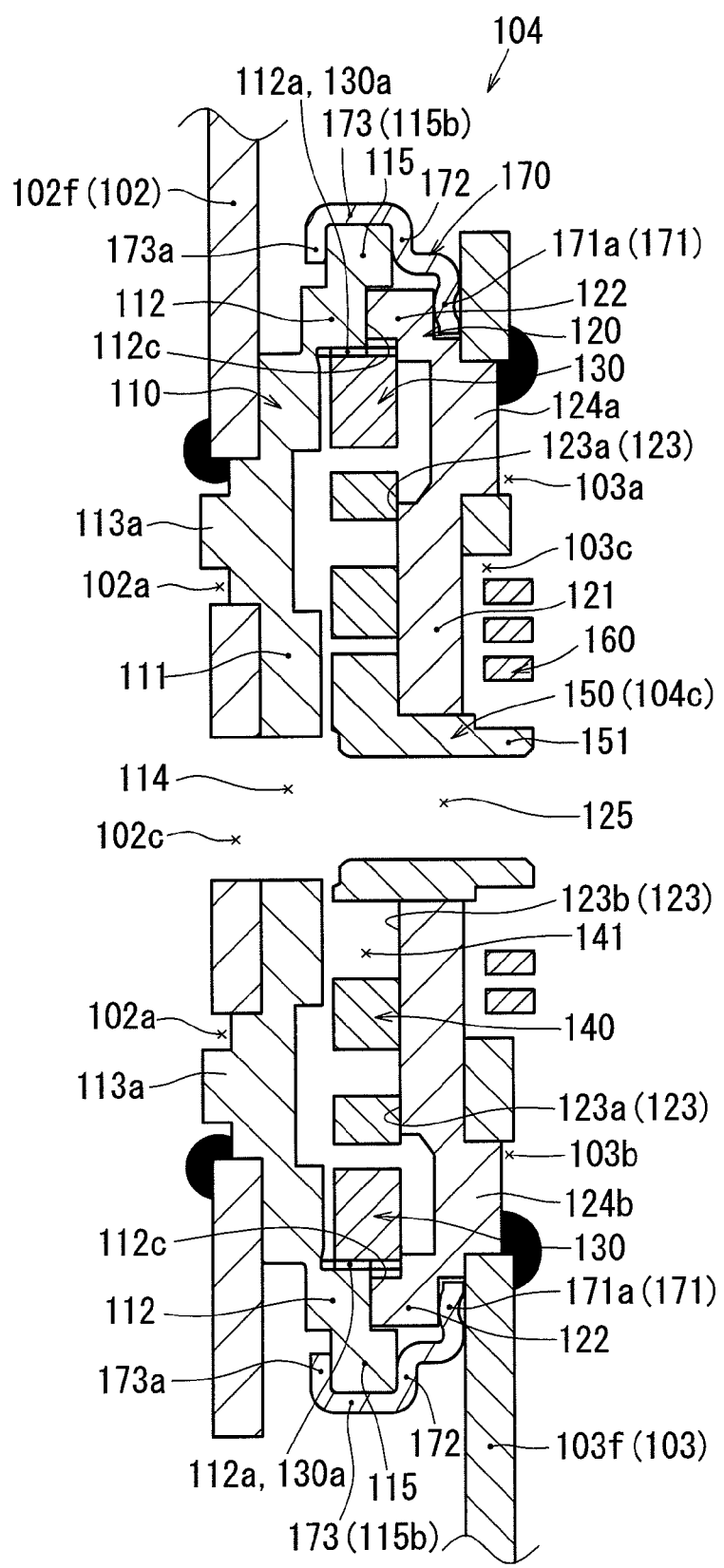
FIG. 13 is an enlarged cross-sectional view taken along line XIII-XIII in FIG. 12.

In particular, as best shown in FIGS. 9 and 13, the first housing 110 has a disk-shaped base portion 111, an annular wall portion 112 and an enlarged annular flanged portion 115 (a support portion). The annular wall portion 112 is axially projected from a circumferential periphery of the base portion 111 along a rotational axis of the first housing 110. The flanged portion 115 is radially outwardly projected from the wall portion 112 such that an annular shoulder portion 112c can be formed therebetween. Thus, the first housing 110 has a circular shouldered recess therein. Further, the first housing 110 may preferably be formed by half die cutting a circular sheet material or sheet blank (not shown).

Figure 15:
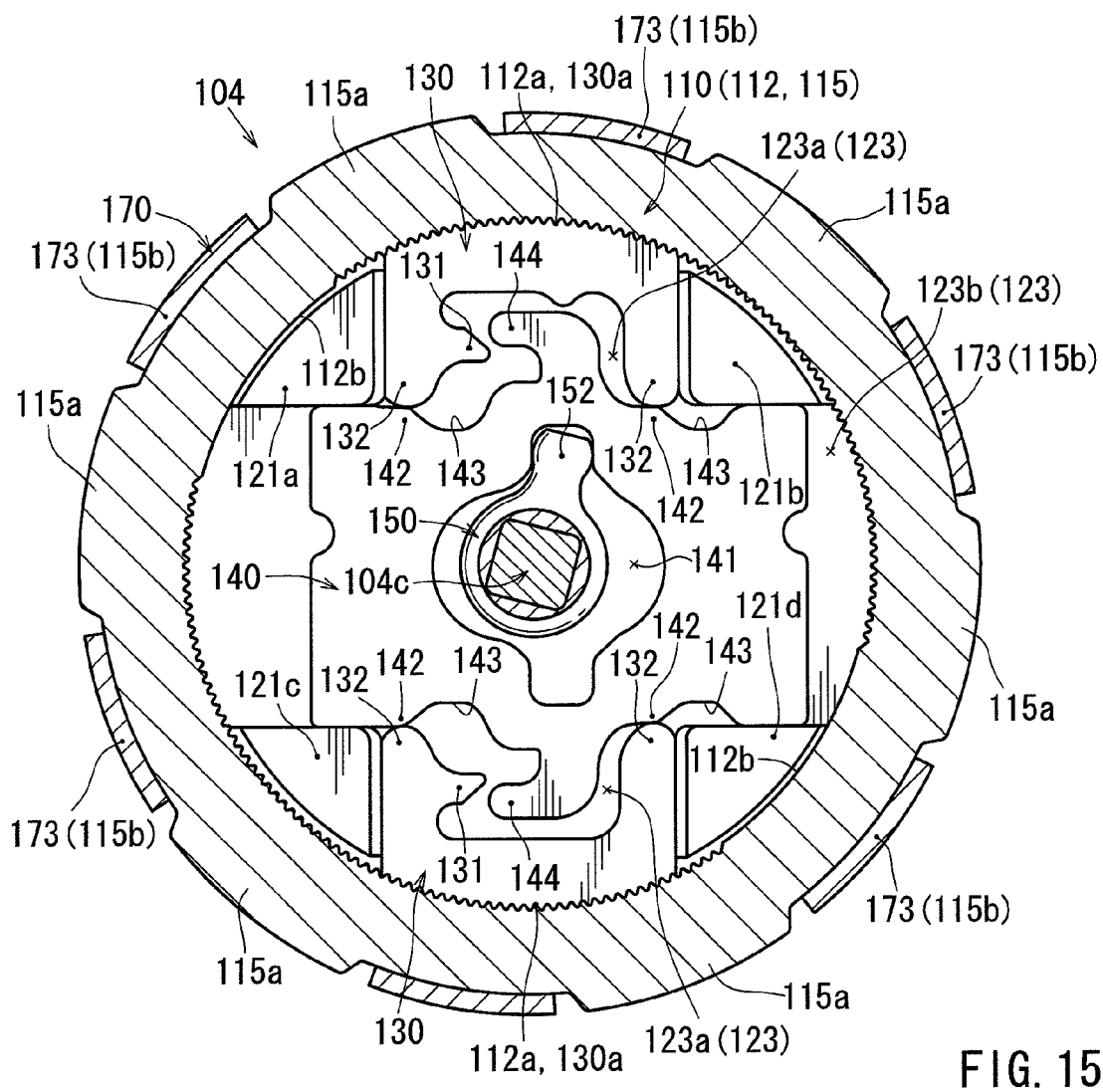
FIG. 15 is an enlarged cross-sectional view taken along line XV-XV in FIG. 11, which illustrates a condition in which the reclining device is locked.
Figure 16:
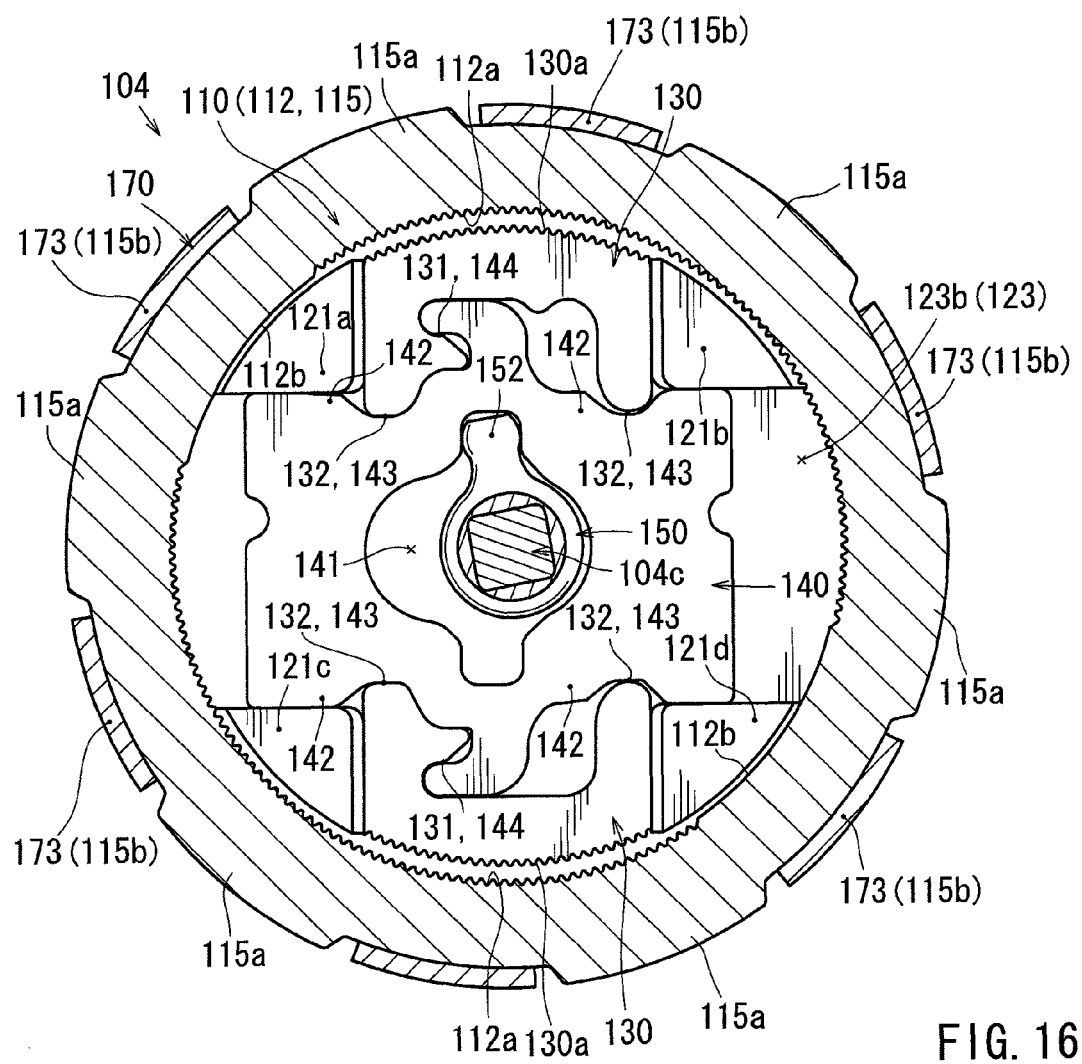
FIG. 16 is an enlarged cross-sectional view taken along line XV-XV in FIG. 11, which illustrates a condition in which the reclining device is unlocked.

As shown in FIGS. 9, 15 and 16, the annular wall portion 112 of the first housing 110 includes inwardly-faced toothed portions 112a and non-toothed portions 112b. These portions 112a and 112b are formed in an inner circumferential surface of the wall portion 112. However, the non-toothed portions 112b may preferably be protruded inwardly than the toothed portions 112a. The non-toothed portions 112b are positioned in two locations of the inner circumferential surface of the wall portion 112. The two locations are angularly spaced apart 180 degrees, so that the toothed portions 112a are circumferentially spaced apart by the non-toothed portions 112b. As will be recognized, the toothed portions 112a can define the lockable rotational region of the reclining devices 104. Conversely, the non-toothed portions 112b can define the unlockable rotational region of the reclining devices 104.

Figure 11:
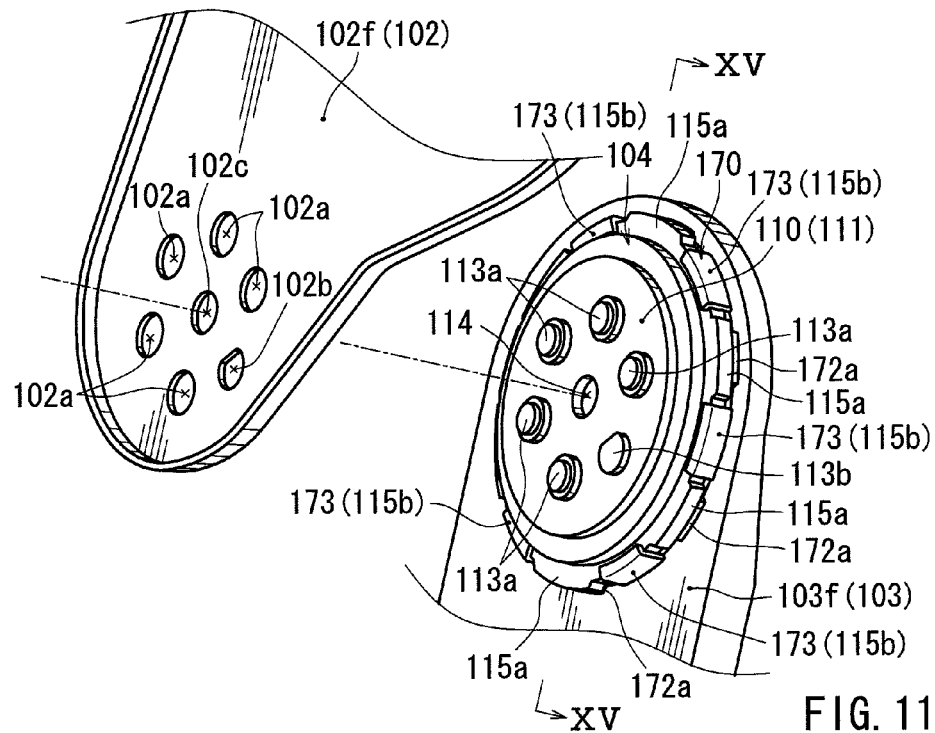
FIG. 11 is a perspective view of the reclining device that is attached to a cushion frame.

As shown in, for example, FIGS. 9 and 11, the first housing 110 has a receiving opening 114 that passes through a central portion of the base portion 111 thereof. The receiving opening 114 is shaped such that the operating shaft 104c can be inserted therethrough. Further, the first housing 110 has a plurality of circular engagement projections or dowels 113a and a D-shaped engagement projection or dowel 113b. The dowels 113a and 113b are respectively formed in the base portion 111 so as to be projected in a direction opposite to the wall portion 112 formed in the base portion 111. The dowels 113a and 113b may preferably be positioned along the circumferential periphery of the base portion 111 at equal intervals.

Further, as best shown in FIG. 11, the receiving opening 114 and the dowels 113a and 113b may preferably be positioned so as to correspond to a through hole 102c and a plurality of circular dowel insertion holes 102a and a D-shaped dowel insertion hole 102b that are respectively formed in the back frame 102f. Therefore, the first housing 110 can be attached to the back frame 102f by fitting the dowels 113a and 113b into the dowel insertion holes 102a and 102b. At this time, the receiving opening 114 can be aligned with the through hole 102c. Further, the first housing 110 may preferably be affixed to the back frame 102f by welding.

Further, as shown in FIGS. 9, 15 and 16, the first housing 110 has a plurality of (six in this embodiment) radially projected portions 115a and a plurality of (six in this embodiment) radially depressed portions 115b. The radially projected portions 115a and the radially depressed portions 115b are respectively formed in a circumferential end surface of the base portion 111 (the flanged portion 115), so as to be alternately positioned at equal intervals. Therefore, a total radial thickness of the wall portion 112 and the flanged portion 115 can be partially thickened due to the radially projected portions 115a. In other words, a distance between the toothed portions 112a and the circumferential end surface of the base portion 111 (the flanged portion 115) can be partially increased.

Conversely, as best shown in FIGS. 9 and 13, the second housing 120 has a disk-shaped base portion 121 and an annular wall portion 122. The wall portion 122 is axially projected from a circumferential periphery of the base portion 121 along the rotational axis of the first housing 110 in a direction opposite to the wall portion 112 of the first housing 110. Further, similar to the first housing 110, the second housing 120 may preferably be formed by half die cutting a circular sheet material or sheet blank (not shown).

Figure 14:
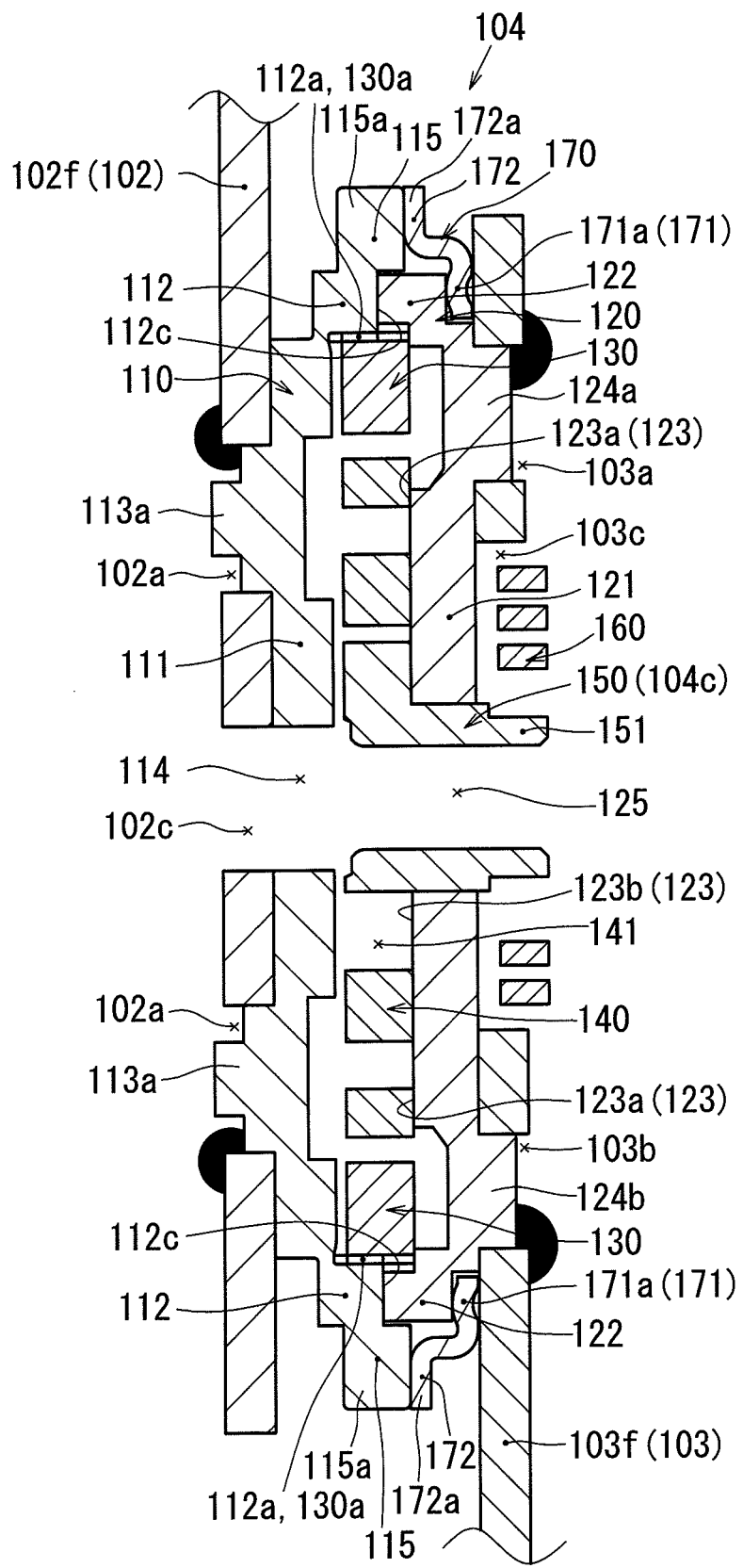
FIG. 14 is an enlarged cross-sectional view taken along line XIV-XIV in FIG. 12.

As shown in FIGS. 13 and 14, the annular wall portion 122 of the second housing 120 is shaped so as to be loosely fit within the flanged portion 115 of the first housing 110 while an inner surface of the wall portion 122 contacts an annular shoulder portion 112c formed in the first housing 110 when the first and second housings 110 and 120 are axially mated or coupled to each other. Thus, the first and second housings 110 and 120 can be coupled to each other while the wall portion 122 of the second housing 120 is loosely encircled by the flanged portion 115 of the first housing 110. That is, the first and second housings 110 and 120 can be coupled to each other so as to be slidably rotatable relative to each other.

As shown in FIGS. 13 and 14, the wall portion 122 of the second housing 120 may preferably have an inner diameter greater than the inner diameter of the wall portion 112 of the first housing 110

Figure 12:
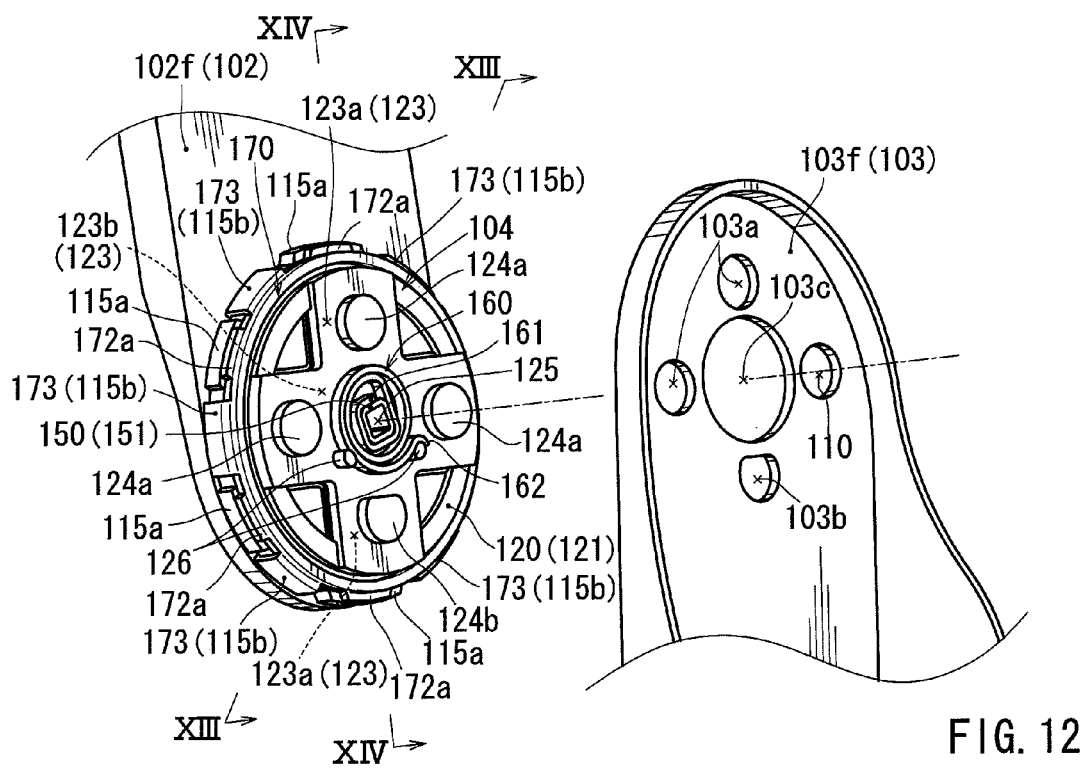
FIG. 12 is a perspective view of the reclining device that is attached to the back frame.

As shown in, for example, FIGS. 9 and 12, the second housing 120 has a receiving opening 125 that passes through a central portion of the base portion 121 thereof. The receiving opening 125 is positioned so as to be axially aligned with the receiving opening 114 of the first housing 110 when the first and second housings 110 and 120 are oppositely coupled to each other. The receiving opening 125 is shaped such that the operating shaft 104c can be inserted therethrough. Further, the second housing 120 has a plurality of circular engagement projections or dowels 124a and a D-shaped engagement projection or dowel 124b. The dowels 124a and 124b are respectively formed in the base portion 121 so as to be projected in a direction opposite to the wall portion 122 formed in the base portion 121. The dowels 124a and 124b may preferably be positioned along the circumferential periphery of the base portion 121 at equal intervals.

Further, as best shown in FIG. 12, the receiving opening 125 and the dowels 124a and 124b may preferably be positioned so as to correspond an enlarged through hole 103c and a plurality of circular dowel insertion holes 103a and a D-shaped dowel insertion hole 103b that are respectively formed in the cushion frame 103f. Therefore, the second housing 120 can be attached to the cushion frame 103f by fitting the dowels 124a and 124b into the dowel insertion holes 103a and 103b. At this time, the receiving opening 125 can be aligned with the through hole 103c. Further, the second housing 120 may preferably be affixed to the cushion frame 103f by welding.

As shown in FIGS. 9, 15 and 16, the second housing 120 has an inner circular recessed portion in which a cross-shaped guide groove 123 defined by four guide portions 121a-121d is formed. As shown in FIG. 9, the guide groove 123 may preferably be formed by depressing the base portion 121 of the second housing 120. The cross-shaped guide groove 123 may preferably include guide groove portions 123a and 123b are formed so as to perpendicularly extend vertically and horizontally. The guide groove portions 123a and 123b will respectively be referred to as pawl guide grooves 123a and cam guide grooves 123b hereinafter. As shown in FIGS. 15 and 16, the slide pawls 130 are disposed in the pawl guide grooves 123a so as to be radially vertically slidable therealong. Conversely, the slide cam 140 is disposed in the cam guide grooves 123b so as to be radially laterally slidable therealong.

As shown in FIGS. 9, 15 and 16, the slide cam 140 is a plate having substantially a rectangular shape and is shaped so as to be slidaby received in the cam guide grooves 123b formed in the second housing 120. The slide cam 140 is axisymmetrically shaped and has hook-shaped engagement projections 144 that radially project from the central portions of opposite longer sides thereof. Also, the slide cam 140 has shoulder portions 142 and recessed portions 143 that are respectively formed in the opposite longer sides. The shoulder portions 142 and the recessed portions 143 are respectively positioned on both sides of the engagement projections 144. The slide cam 140 includes a centrally located bore 141 that can receive the operating member 150.

As shown in FIGS. 1, 15 and 16, both of the slide pawls 130 are plate members that have the same shape as each other with the exception of one aspect that they are formed so as to be exactly opposite to each other. The slide pawls 130 are respectively shaped so as to be slidaby received in the pawl guide grooves 123a formed in the second housing 120. Each slide pawl 130 has an outwardly-faced toothed portion 130a that can engage the toothed portion 112a of the first housing 110. The toothed portion 130a is formed in an arcuate outer periphery of the slide pawl 130, so as to engage the toothed portion 112a when the slide pawl 130 moves radially outwardly along the pawl guide grooves 123a. The slide pawl 130 has a pair of right and left contact portions 132. The contact portions 132 are formed in an inner periphery of the slide pawl 130. Also, the slide pawl 130 has an engagement projection 131 that is positioned between the contact portions 132.

As shown in FIG. 9, the operating member 150 includes a (non-circular) cylindrical shaft portion 151 and an arm portion 152 that outwardly projects from a circumferential surface of shaft portion 151. The arm portion 152 engages a part of the bore 141 of the slide cam 140 (FIGS. 15 and 16). A part of the cylindrical shaft portion 151 is positioned in the receiving opening 125 of the second housing 120. The operating shaft 104c is inserted into the cylindrical shaft portion 151 of the operating member 150. An inner circumferential surface of the cylindrical shaft portion 151 and an outer circumferential surface of the operating shaft 104c may preferably be shaped so as to permit transmission of rotational motion therebetween. That is, the cylindrical shaft portion 151 is shaped so as to be rotatable with the operating shaft 104c. Further, the operating shafts 104c is capable of rotating clockwise in FIGS. 9 and 12 when the operation lever 105 is lifted. Therefore, the cylindrical shaft portion 151 (the arm portion 152) is capable of rotating clockwise in FIGS. 9 and 12 when the operation lever 105 is lifted.

As represented in FIGS. 9 and 12, the spring 160 has a spiral shape as described above and functions as a torsion spring between the second housing 120 and the operating member 150. That is, an inner end 161 of the spring 160 is connected to the outer circumferential surface of the cylindrical shaft portion 151. Conversely, the outer end 162 of the spring 160 is connected to one of engagement projections 126 formed in the base portion 121 of the second housing 120. Thus, the operating member 150 is biased counterclockwise in FIGS. 9 and 12 with respect to the second housing 120 by a force of the spring 160.

As shown in FIG. 1, the clip ring 170 is a shouldered annular steel ring and has a first annular support wall 171 (a first retainer portion) and a second enlarged annular support wall 172 (a second retainer portion). Further, formed in the first support wall 171 are a plurality of projections 171a that are projected inwardly therefrom. The projections 171a may preferably be positioned at equal intervals along the first support wall 171.

In addition, formed in the second support wall 172 are a plurality of (six in this embodiment) foldable strips 173 (fixing portions) that are axially projected therefrom. As shown in FIGS. 9, 15 and 16, the foldable strips 173 may preferably be positioned at equal intervals, so as to engage the radially depressed portions 115b of the first housing 110 when the clip ring 170 is attached to the first and second housings 110 and 120. Further, as shown in FIGS. 15 and 16, each of the foldable strips 173 may preferably be shaped so as to have the substantially same height as the radially projected portions 115a when it engages the radially depressed portions 115b.

Further, integrally formed in the second support wall 172 are a plurality of (six in this embodiment) supplemental support walls 172a (supplemental retainer portions) that are radially projected therefrom. As shown in FIGS. 12 and 14, the supplemental support walls 172a may preferably be positioned at equal intervals, so as to correspond to the radially projected portions 115a of the first housing 110 when the clip ring 170 is attached to the first and second housings 110 and 120. In other words, the supplemental support walls 172a may preferably be positioned between the foldable strips 173. Further, as best shown in FIG. 14, each of the supplemental support walls 172a may preferably be formed so as to extend in the same plane as the second support wall 172. In addition, each of the supplemental support walls 172a may preferably be shaped such that a peripheral end surface thereof can be flush with a peripheral end surface of the radially projected portions 115a when the clip ring 170 is attached to the first and second housings 110 and 120.

As described above, the supplemental support walls 172a are respectively formed so as to extend in the same plane as the second support wall 172. Therefore, as shown in FIG. 14, when the clip ring 170 is attached to the first and second housings 110 and 120, the supplemental support walls 172a can respectively axially contact inner surfaces of the radially projected portions 115a formed in the flanged portion 115 of the first housing 110 while the second support wall 172 axially contacts an inner surface of the flanged portion 115. Conversely, as shown in FIGS. 13 and 14, the first support wall 171 (the projections 171a) axially contacts an outer surface of the wall portion 122 of the second housing 120. Therefore, the clip ring 170 can be reliably positioned with respect to the first and second housings 110 and 120. Thus, when the clip ring 170 is attached to the first and second housings 110 and 120, the first and second support walls 171 and 172 and the supplemental support wall 172a of the clip ring 170 may function as positioning surfaces for the first and second housings 110 and 120.

Next, a manufacturing process of the reclining device 104 will be described.

After the pawls 130, the slide cam 140, the operating member 150 and the spring 160 are attached to the second housing 120, the first and second housings 110 and 120 are axially mated or coupled to each other while the annular wall portion 122 of the second housing 120 is fitted within the flanged portion 115 of the first housing 110. As shown in FIGS. 13 and 14, the first and second housings 110 and 120 thus coupled are circumferentially clamped or fastened via the clip ring 170, so as to be prevented from being axially separated from each other. In particular, the clip ring 170 is positioned such that the foldable strips 173 can engage the radially depressed portions 115b of the first housing 110 while the first support wall 171 (the projections 171a) and the second support wall 172 respectively contact the outer surface of the annular wall portion 122 of the second housing 120 and the inner surface of the flanged portion 115 of the first housing 110. At this time, the supplemental support walls 172a contact the inner surfaces of the radially projected portions 115a. Thereafter, as shown in FIG. 13, end peripheries of the foldable strips 173 of the clip ring 170 are radially crimped so as to be folded over an circumferential periphery of the flanged portion 115 of the first housing 110, thereby forming retainer portions 173a (third retainer portions) that are capable of axially contacting an outer surface of the flanged portion 115 of the first housing 110. As a result, the clip ring 170 is fixed to the first housing 110 while the second housing 120 is axially supported by the first support wall 171 of the clip ring 170, so that the first and second housings 110 and 120 can be fastened. Thus, the reclining device 104 can be assembled.

Further, the end peripheries of the foldable strips 173 may preferably be crimped such that the first and second housings 110 and 120 are relatively rotatable to each other. In particular, the end peripheries of the foldable strips 173 may preferably be crimped so as to produce small clearances between the wall portion 112 of the first housing 110 and the annular wall portion 122 of the second housing 120 and between the annular wall portion 122 of the second housing 120 and the first support wall 171 of the clip ring 170. Further, the first support wall 171 of the clip ring 170 can contact the annular wall portion 122 of the second housing 120 via the projections 171a. As a result, limited sliding friction can be produced between the clip ring 170 and the second housing 120. Thus, the first and second housings 110 and 120 can be smoothly rotated relative to each other.

Figure 17:
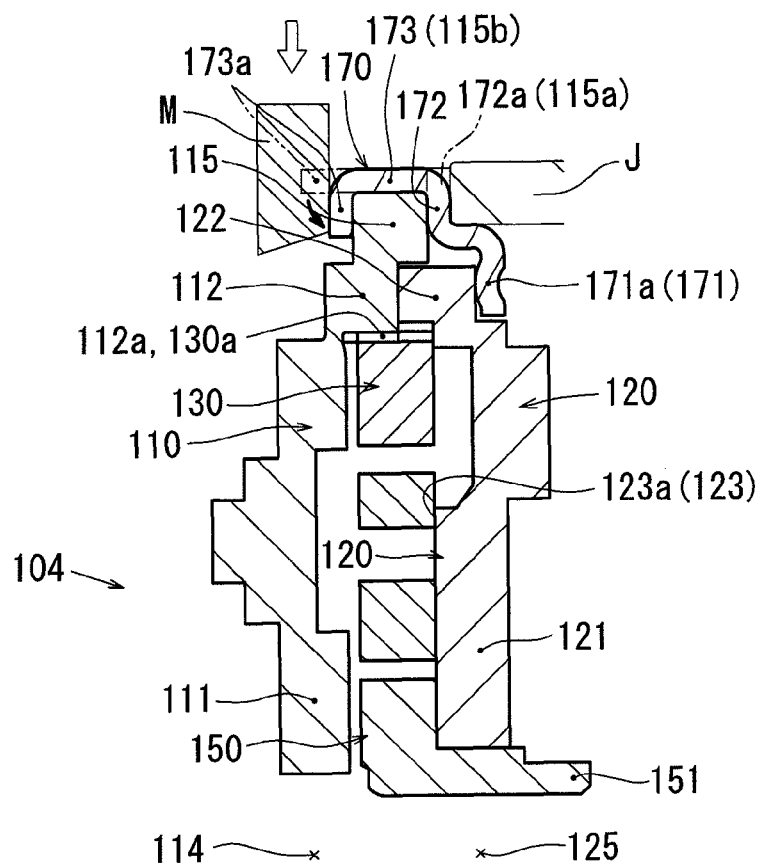
FIG. 17 is an enlarged cross-sectional view of the reclining device, which schematically illustrates a process for crimping a clip ring using a crimping machine having a support die and a crimping die.
Figure 17:
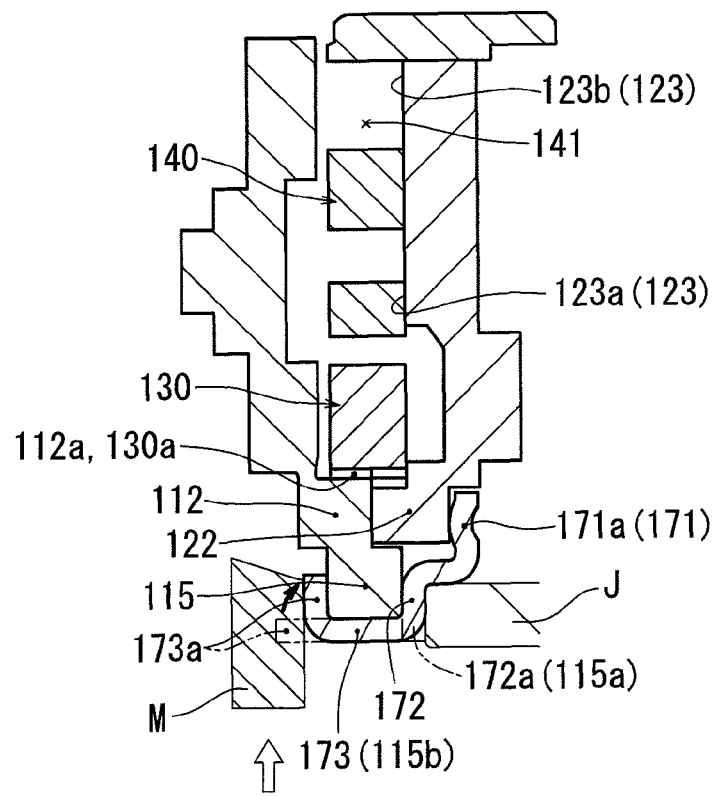

Further, in order to crimp the end peripheries of the foldable strips 173, a crimping machine (not shown) having a support die J and a crimping die M is used. That is, as shown in FIG. 17, after the clip ring 170 is circumferentially attached to the first and second housings 110 and 120, the end peripheries of the foldable strips 173 of the clip ring 170 are radially crimped by the crimping die M while the second support wall 172 of the clip ring 170 is axially supported by the support die J.

However, as described above, the second support wall 172 has the supplemental support walls 172a that are circumferentially partially formed therein. Therefore, when the second support wall 172 of the clip ring 170 is axially supported by the support die J, the supplemental support walls 172a can be simultaneously supported by the support die J. That is, as shown in FIG. 17, the clip ring 170 can have a substantial support surface that can be supported by the support die J. Therefore, when the end peripheries are radially crimped by the crimping die M, the second support wall 172 of the clip ring 170 can be sufficiently axially supported by the support die J due to the supplemental support walls 172a even if the second support wall 172 is radially diminished.

Thus, in the reclining device 104 of the present embodiment, the second support wall 172 of the clip ring 170 has the supplemental support walls 172a corresponding to the radially projected portions 115a of the first housing 110. Therefore, the second support wall 172 can have a sufficient area even if the second support wall 172 is radially diminished in order to downsize the reclining device 104. As a result, the second support wall 172 of the clip ring 170 can be reliably supported by the support die J when the clip ring 170 is crimped. This may lead to increased accuracy of crimping.

As shown in FIGS. 11 and 12, the reclining device 104 thus assembled is connected to the back frame 102f and the cushion frame 103f while the operating shaft 104c is passed through the through hole 102c formed in the back frame 102f and the enlarged through hole 103c formed in the cushion frame 103f. In particular, the first housing 110 is attached to the back frame 102f by fitting the dowels 113a and 113b into the dowel insertion holes 102a and 102. At the same time, the second housing 120 is attached to the cushion frame 103f by fitting the dowels 124a and 124b into the dowel insertion holes 103a and 103b. Similarly, the reclining device 104 that is disposed on the right side of the vehicle seat 101 is connected to the back frame 102f and the cushion frame 103f. Thus, the back frame 102f and the cushion frame 103f (the seat back 102 and the seat cushion 103) are respectively connected by the two reclining devices 104

Operation of the reclining device 104 will now be described with reference to FIGS. 15 and 16.

Further, each of FIGS. 15 and 16 illustrates a condition in which the reclining device 104 is in the lockable rotational region. In particular, each of FIGS. 15 and 16 illustrates a condition in which the seat back 102 is in the substantially farthest rearward rotational position (i.e., a rotational position shown by broken lines in FIG. 10).

As shown in FIG. 15, when the reclining device 104 is connected to the back frame 102f and the cushion frame 103f, the slide cam 140 is slidaby received in the cam guide grooves 123b of the second housing 120. Conversely, the slide pawls 130 are respectively slidably received in the pawl guide grooves 123a of the second housing 120 while they are prevented from moving in a circumferential direction of the second housing 120. Further, the operating member 150 is biased clockwise in FIG. 15 (counterclockwise in FIGS. 9 and 12) by the force of the spring 160. Thus, the slide cam 140 is applied with an actuating force in a rightward direction in FIG. 15 via the arm portion 152 of the operating member 150, so as to be moved to a rightmost position thereof. At this time, the shoulder portions 142 of the slide cam 140 respectively contact or engage the contact portions 132 of the slide pawls 130, so that the slide pawls 130 are respectively radially outwardly moved to outermost positions thereof. As a result, the toothed portions 130a of the slide pawls 130 engage the toothed portions 112a of the first housing 110. Thus, the reclining device 104 can be maintained in the locking condition (FIG. 15). As a result, the seat back 102 can be maintained in the substantially rotational position shown by broken lines in FIG. 10. Further, at this time, the engagement projections 144 of the slide cam 140 are respectively positioned opposite to the engagement projections 131 of the slide pawls 130 while they are laterally spaced from the engagement projections 131.

When the operating shaft 104c is rotated about its axis by operating (lifting) the operation lever 105 (FIG. 10) in order to adjust the tilting angle of the seat back 102, the operating member 150 moves counterclockwise in FIG. 15 against the force of the spring 160. At this time, the slide cam 140 is applied with an actuating force in a leftward direction in FIG. 15 via the arm portion 152 of the operating member 150. Thus, the slide cam 140 is applied with an actuating force in a leftward direction in FIG. 15 via the arm portion 152 of the operating member 150, so as to be moved to a leftmost position thereof (FIG. 16). As a result, as shown in FIG. 16, the shoulder portions 142 of the slide cam 140 are respectively disengaged from the contact portions 132 of the slide pawls 130. At the same time, the engagement projections 144 of the slide cam 140 respectively engage the engagement projections 131 of the slide pawls 130, so that the slide pawls 130 are respectively radially inwardly moved to innermost positions thereof while the contact portions 132 of the slide pawls 130 are introduced into the recessed portions 143 of the slide cam 140. As a result, the toothed portions 130a of the slide pawls 130 are respectively disengaged from the toothed portions 112a of the first housing 110. Thus, the reclining device 104 can be switched to the unlocking condition (FIG. 16). Therefore, the seat back 102 can be rotated within the rearward rotational range R thereof (which range corresponds to the lockable rotational region of the reclining device 104), so that the tilting angle thereof can be adjusted.

When the lever 105 is released after the tilting angle of the seat back 102 is adjusted, the slide cam 140 is moved to the rightmost position. As a result, the toothed portions 130a of the slide pawls 130 engage the toothed portions 112a of the first housing 110 again, so that the reclining device 104 can be returned to the locking condition. Thus, the tilting angle of the set back 102 can be fixed to an adjusted tilting angle.

Further, when the seat back 102 is rotated into the forward rotational range F thereof (which range corresponds to the unlockable rotational region of the reclining device 104) beyond the normal position thereof, the slide cam 140 is moved to the rightmost position by releasing the lever 105. However, the toothed portions 130a of the slide pawls 130 contact the non-toothed portions 112b of the first housing 110 without engaging the toothed portions 112a of the first housing 110, so that the reclining device 104 can be maintained in the unlocking condition. As a result, the seat back 102 can be automatically folded on the seat cushion 103.

Third Detailed Representative Embodiment

The third detailed representative embodiment will now be described in detail with reference to FIGS. 18-20.

Because the third embodiment relates to the second embodiment, only the constructions and elements that are different from the second embodiment will be explained in detail. Elements that are the same in the second and third embodiments will be identified by the same reference numerals and a detailed description of such elements may be omitted.

Figure 18:
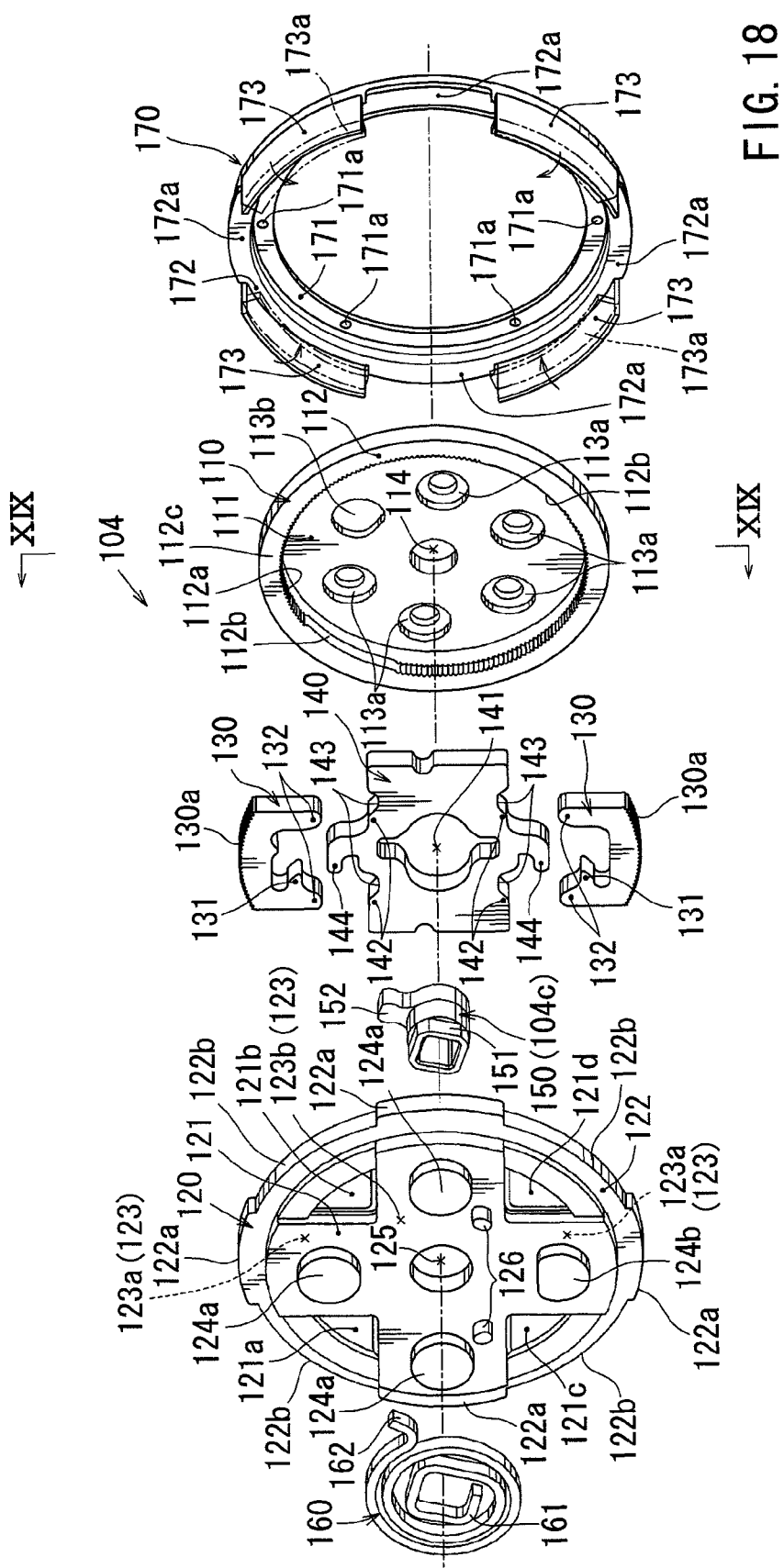
FIG. 18 is an exploded perspective view of a reclining device according to a third representative embodiment of the present invention.

In this embodiment, as shown in FIG. 18, unlike the second embodiment, the enlarged annular flanged portion 115 of the first housing 110 is omitted. Further, the annular wall portion 112 of the first housing 110 is shaped so as to be loosely fit within the annular wall portion 122 (a support portion) of the second housing 120 while the annular shoulder portion 112c formed in the first housing 110 contacts an inner surface of the base portion 121 of the second housing 120 when the first and second housings 110 and 120 are axially mated or coupled to each other.

Figure 19:
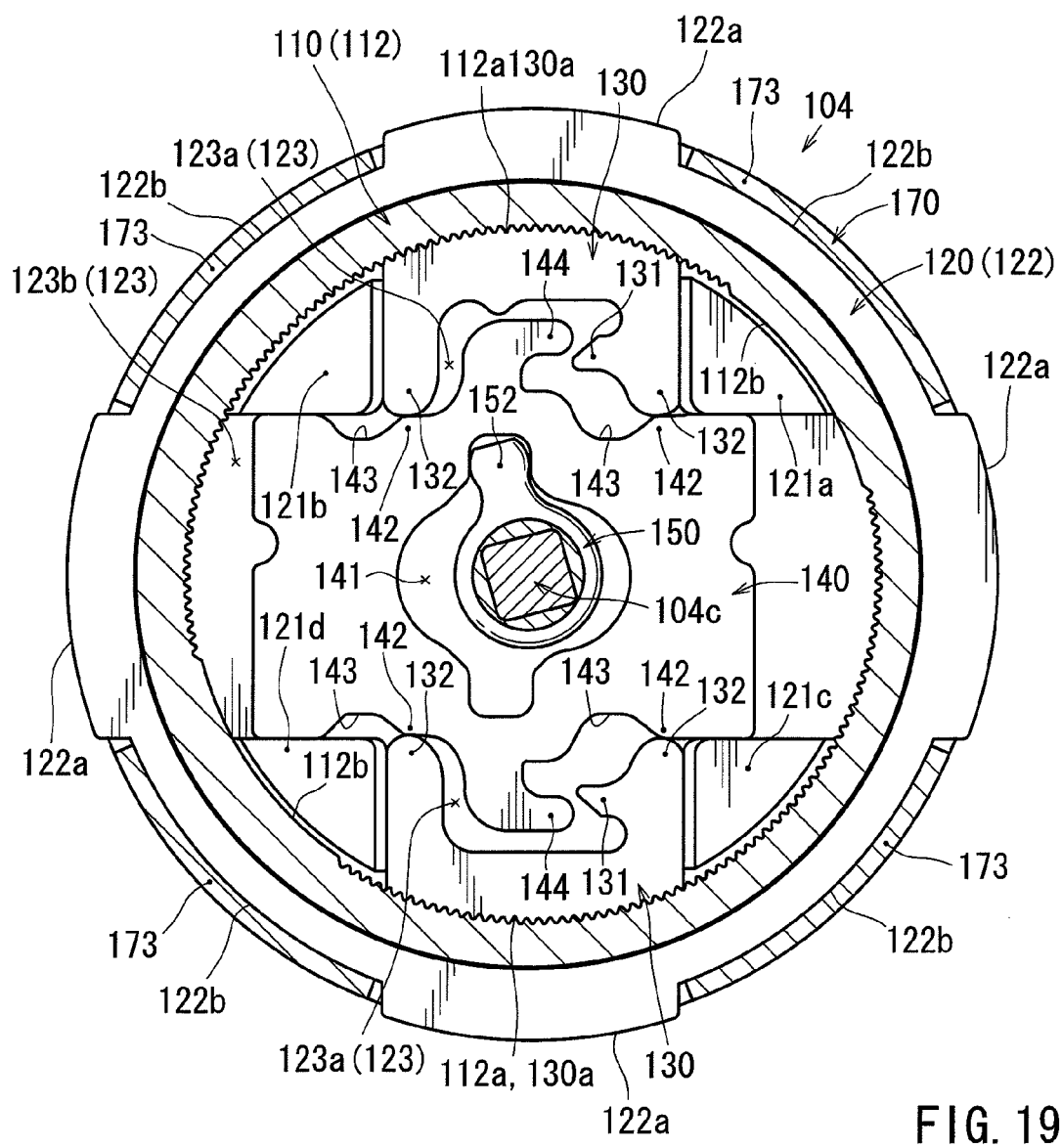
FIG. 19 is an enlarged cross-sectional view similar to FIG. 15, which illustrates a condition in which the reclining device is locked.
Figure 20:
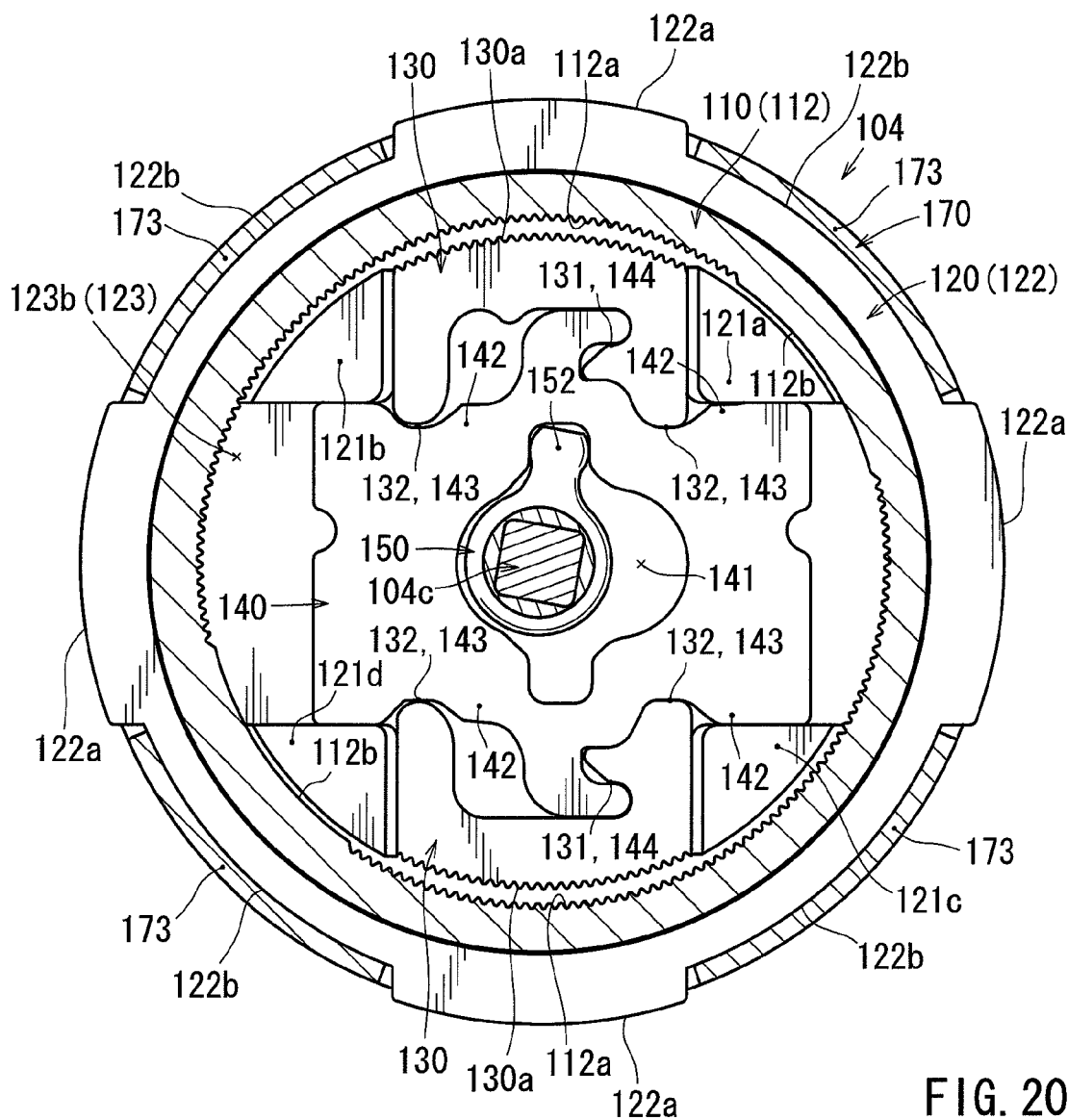
FIG. 20 is an enlarged cross-sectional view similar to FIG. 16, which illustrates a condition in which the reclining device is unlocked.

Further, as shown in FIGS. 18-20, unlike the second embodiment, the second housing 120 has a plurality of (four in this embodiment) radially projected portions 122a and a plurality of (four in this embodiment) radially depressed portions 122b. The radially projected portions 122a and the radially depressed portions 122b are respectively formed in a circumferential periphery of the base portion 121 (the annular wall portion 122), so as to be alternately positioned at equal intervals.

In addition, formed in the second support wall 172 of the clip ring 170 are a plurality of (four in this embodiment) foldable strips 173 (fixing portions) that are axially projected therefrom. The foldable strips 173 may preferably be positioned at equal intervals, so as to engage the radially depressed portions 122b of the second housing 120 when the clip ring 170 is attached to the first and second housings 110 and 120. Similarly, formed in the second support wall 172 are a plurality of (four in this embodiment) supplemental support walls 172*a* (supplemental retainer portions) that are radially projected therefrom. The supplemental support walls 172*a* may preferably be positioned at equal intervals, so as to correspond to the radially projected portions 122*a* of the second housing 120 when the clip ring 170 is attached to the first and second housings 110 and 120.

Further, when the clip ring 170 is attached to the first and second housings 110 and 120, the supplemental support walls 172*a* can respectively axially contact inner surfaces of the radially projected portions 122*a* formed in the annular wall portion 122 of the second housing 120 while the second support wall 172 axially contacts an inner surface of the annular wall portion 122. Conversely, the first support wall 171 (the projections 171*a*) axially contacts an outer surface of the wall portion 112 of the first housing 110.

In the manufacturing process of the reclining device 104, the clip ring 170 is positioned such that the foldable strips 173 can engage the radially depressed portions 122*b* of the second housing 120 while the first support wall 171 (the projections 171*a*) and the second support wall 172 respectively contact the outer surface of the annular wall portion 112 of the first housing 110 and the inner surface of the annular wall portion 122 of the second housing 120. At this time, the supplemental support walls 172*a* contact the inner surfaces of the radially projected portions 122*a*. Thereafter, the end peripheries of the foldable strips 173 of the clip ring 170 are radially crimped so as to be folded over the circumferential periphery of the annular wall portion 122 of the second housing 120, thereby forming retainer portions 173*a* (third retainer portions) that are capable of axially contacting an outer surface of the annular wall portion 122 of the second housing 120.

Naturally, various changes and modifications may be made to the present invention without departing from the scope of the invention. For example, the reclining devices 4 and 104 can be used to connect the seat back 2 and 102 to a vehicle floor (not shown) and not the seat cushion 3 and 103. Further, the reclining devices 4 and 104 can be used to rotatably connect the vehicle seat 1 and 101 (the seat cushion 3 and 103) to the vehicle floor. Further, the reclining devices 4 and 104 can be used to rotatably connect an ottoman (not shown) to the seat cushion 3 and 103 or the vehicle floor.

What is claimed is:

1. A connecting device that is capable of rotatably connecting a first component and a second component of a vehicle seat, comprising:
   first and second connecting elements that are axially oppositely coupled to each other so as to be rotatable relative to each other; and
   a retainer member that is arranged and constructed to clamp the first and second connecting elements, thereby preventing the first and second connecting elements from being axially separated from each other,
   wherein the first and second connecting elements are arranged and constructed to be switched between a condition in which the first and second connecting elements can rotate relative to each other and a condition in which the first and second connecting elements can be prevented from rotating relative to each other,
   wherein the second connecting element has a plurality of radially projected portions and a plurality of radially depressed portions that are respectively formed in a circumferential end surface thereof,
   wherein the retainer member has a first retainer portion that is capable of axially contacting an outer surface of a circumferential periphery of the first connecting element, a second retainer portion that is capable of axially contacting an inner surface of a circumferential periphery of the second connecting element, a plurality of fixing portions that are axially projected from the second retainer portion toward the circumferential end surface of the second connecting element, and a plurality of supplemental retainer portions that are radially projected from the second retainer portion and are capable of axially contacting the radially projected portions of the second connecting element,
   wherein the retainer member is positioned such that the fixing portions can engage the radially depressed portions of the second connecting element,
   wherein end peripheries of the fixing portions are radially crimped, thereby forming a third retainer portion that is capable of axially contacting an outer surface of the circumferential periphery of the second connecting element, and
   wherein the supplemental retainer portions are arranged and constructed to be axially supported by a support die of a crimping machine when the end peripheries of the fixing portions are crimped while the second retainer portion is axially supported by the support die.

2. The connecting device as defined in claim 1, wherein the supplemental retainer portions are shaped so as to extend in the same plane as the second retainer portion.

3. The connecting device as defined in claim 1, wherein the fixing portions and the supplemental retainer portions are respectively alternately positioned at equal intervals.

* * * * *